(12) United States Patent
Koshikawa et al.

(10) Patent No.: US 12,203,859 B2
(45) Date of Patent: Jan. 21, 2025

(54) DEVICE FOR DETECTING CONTAMINATION WITH PHOTOSYNTHESIS INHIBITOR AND METHOD FOR DETECTING CONTAMINATION WITH PHOTOSYNTHESIS INHIBITOR

(71) Applicants: National Institute for Environmental Studies, Ibaraki (JP); Japan Agency for Marine-Earth Science and Technology, Yokosuka (JP)

(72) Inventors: Hiroshi Koshikawa, Ibaraki (JP); Masanobu Kawachi, Ibaraki (JP); Shigeshi Fuchida, Ibaraki (JP); Shuhei Ota, Ibaraki (JP); Tetsuya Miwa, Kanagawa (JP); Yasuo Furushima, Kanagawa (JP); Shunsuke Kondo, Kanagawa (JP)

(73) Assignees: National Institute for Environmental Studies, Ibaraki (JP); Japan Agency for Marine-Earth Science and Technology, Yokosuka (JP)

( * ) Notice: Subject to any disclaimer, the term of this patent is extended or adjusted under 35 U.S.C. 154(b) by 709 days.

(21) Appl. No.: 17/430,244

(22) PCT Filed: Feb. 6, 2020

(86) PCT No.: PCT/JP2020/004646
§ 371 (c)(1),
(2) Date: Aug. 11, 2021

(87) PCT Pub. No.: WO2020/166489
PCT Pub. Date: Aug. 20, 2020

(65) Prior Publication Data
US 2022/0163450 A1    May 26, 2022

(30) Foreign Application Priority Data

Feb. 15, 2019   (JP) .................................. 2019-026026

(51) Int. Cl.
*G01N 21/64* (2006.01)
(52) U.S. Cl.
CPC .............................. *G01N 21/6486* (2013.01)
(58) Field of Classification Search
CPC ...... A61K 31/327; A61K 33/10; A61K 33/18; A61K 33/40; A61K 38/44; A61K 9/0004;
(Continued)

(56) References Cited

U.S. PATENT DOCUMENTS

2004/0178358 A1    9/2004  Kreiss et al.
2012/0184440 A1    7/2012  Fuhrer

FOREIGN PATENT DOCUMENTS

CN    104215616 A    12/2014
JP    2004533853 A    11/2004
(Continued)

OTHER PUBLICATIONS

Office Action for App. No. CN 202080013741.7 mailed Sep. 29, 2023.
(Continued)

*Primary Examiner* — Tri T Ton
(74) *Attorney, Agent, or Firm* — Wolf, Greenfield & Sacks, P.C.

(57) ABSTRACT

The present invention provides a device (1) for detecting contamination with a photosynthesis inhibitor, the device including a collection device (10) configured to collect a test liquid, a light-blocking pretreatment tank (21) configured to store the test liquid (2) collected by the collection device in a state of containing phytoplankton, a stirring device configured to maintain a floating state of the phytoplankton in
(Continued)

the test liquid stored in the pretreatment tank, an irradiation light source configured to irradiate the phytoplankton in the test liquid stored in the pretreatment tank with weak light having an underwater photon flux density that does not cause photoinhibition, a drainage conduit (40) configured to allow the test liquid discharged from the pretreatment tank to flow thereinto, and a fluorescence quantum efficiency measuring machine (50) provided for the drainage conduit and configured to measure a fluorescence quantum efficiency of the phytoplankton in the test liquid discharged from the pretreatment tank, and a method for detecting contamination with a photosynthesis inhibitor, the method including a liquid supply step, a storing and weak-light irradiation step, and a fluorescence quantum efficiency measurement step.

7 Claims, 5 Drawing Sheets

(58) Field of Classification Search
CPC ...... A61K 9/0053; A61K 9/20; A61K 9/2806; A61K 9/4808; A61K 9/4891; A61K 2300/00; A61K 33/00; A61K 38/42; A61K 47/02; C02F 2103/007; C02F 2103/08; C12N 9/0065; C12Y 111/01006; G01N 1/14; G01N 2001/1025; G01N 2021/635; G01N 2035/00534; G01N 21/6486; G01N 21/94; G01N 35/1095; Y02A 50/30; A61P 1/00; A61P 29/00; A61P 31/04; C23C 14/0036; C23C 14/0042; C23C 14/0057; C23C 14/06; C23C 14/0617; C23C 14/0641; C23C 14/14; C23C 14/34; C23C 14/35; G02B 1/10; G02B 26/001; G02B 5/28; G02B 5/285; G02B 5/286; G02B 5/288
See application file for complete search history.

(56) References Cited

FOREIGN PATENT DOCUMENTS

| JP | 2006284335 A | | 10/2006 |
|---|---|---|---|
| JP | 2015008676 A | | 1/2015 |
| KR | 20140104824 A | | 8/2014 |
| SU | 950682 A1 | | 8/1982 |
| SU | 950682 B | * | 8/1982 |
| WO | WO 2005/062027 A1 | | 7/2005 |

OTHER PUBLICATIONS

Notice of Allowance for Japanese App. No. 2019-026026 mailed Nov. 15, 2022.
Extended European Search Report for Application No. EP 20756452.7 mailed Sep. 26, 2022.
Babin et al., Remote sensing of sea surface Sun-induced chlorophyll fluorescence: consequences of natural variations in the optical characteristics of phytoplankton and the quantum yield of chlorophyll a fluorescence. Int. J. of Remote Sensing. 1996; 17(12):2417-2448. doi: 10.1080/01431169608948781.
Kurzbaum et al., Alterations in delayed and direct phytoplankton fluorescence in response to the diurnal light cycle. Hydrobiologia. Dec. 2009;639:197-203. doi: 10.1007/s10750-009-0024-2.
International Search Report for PCT/JP2020/004646 mailed Apr. 21, 2020.
Joshi et al., Chlorophyll a Fluorescence as a Probe of Heavy Metal Ion Toxicity in Plants. 2004. Chapter 25. 637-661.
Schreiber, Pulse-Amplitude-Modulation (PAM) Fluorometry and Saturation Pulse Method: An Overiew. Jan. 2004. Chapter 11. 279-319.
Sjollema et al., Hazard and risk of herbicides for marine microalgae. Environ Pollut. Apr. 2014;187:106-11. doi: 10.1016/j.envpol.2013. 12.019. Epub Jan. 22, 2014. PMID: 24463473.

* cited by examiner

DEVICE FOR DETECTING CONTAMINATION WITH PHOTOSYNTHESIS INHIBITOR AND METHOD FOR DETECTING CONTAMINATION WITH PHOTOSYNTHESIS INHIBITOR

CROSS-REFERENCE TO RELATED APPLICATIONS

This Application is a National Stage filing under 35 U.S.C. 371 of International Patent Application Serial No. PCT/JP2020/004646, filed Feb. 6, 2020, which claims foreign priority benefits under 35 U.S.C. § 119 (a)-(d) or 35 U.S.C. § 365 (b) of Japanese Application Number 2019-026026, filed Feb. 15, 2019. The entire contents of these applications are incorporated herein by reference in their entirety.

TECHNICAL FIELD

The present invention relates to a device for detecting contamination with a photosynthesis inhibitor and a method for detecting contamination with a photosynthesis inhibitor.

BACKGROUND ART

In recent years, sea-floor mineral resources for commercialization have been developed all over the world. As a result of tests conducted in research vessels (Kairei, Chikyu, and Kaimei) and laboratories, the inventors found that the reactivity between sulfide minerals of sea-floor hydrothermal deposits and seawater increases under high-temperature and oxidative conditions such as the ocean surface layer, various heavy metal elements are eluted, and the eluate containing heavy metal elements at a ppb to ppm level leads to a decrease in the current existing amount of phytoplankton and growth inhibition.

Based on this finding, in the future commercial development of sea-floor mineral resources, it is considered that measures need to be taken to minimize leakage of ore particles and eluted heavy metals from offshore plants to the ocean surface layer in a higher-temperature and more oxidative environment compared to that of the deep sea, and at the same time, a water quality-monitoring system for surface seawater needs to be introduced to continuously monitor the presence or absence of leakage from offshore plants.

As a result of examination conducted on chemical analysis methods that can be performed in offshore plants, the inventors clarified that many chemical analysis methods require time-consuming pretreatments such as a desalting operation to quantify heavy metals in seawater, and thus real-time measurement is not easy.

Further, it is considered that since simultaneous analysis of multiple elements requires expensive and large-scale equipment such as inductively coupled plasma-mass spectrometers and inductively coupled plasma spectrophotometers, such equipment is not suitable as water quality-monitoring equipment in offshore plants.

Meanwhile, chlorophyll contained in phytoplankton emits fluorescence in a case of irradiation with light. Further, Patent Document 1 describes a method of estimating the primary productivity of phytoplankton by measuring the maximum fluorescence intensity, the minimum fluorescence intensity and the like among the fluorescence emitted by chlorophyll of phytoplankton.

Further, Non-Patent Document 1 describes a method of calculating the amount of change in fluorescence intensity and the fluorescence quantum efficiency based on the maximum fluorescence intensity and the minimum fluorescence intensity of plants and phytoplankton.

Further, Non-Patent Document 2 describes that the amount of change in fluorescence intensity and fluorescence quantum efficiency of plants and phytoplankton decrease due to contamination with heavy metals at a concentration that causes photosynthesis inhibition.

Further, Non-Patent Document 3 describes that the fluorescence quantum efficiency of marine phytoplankton decreases due to pesticides that directly inhibit photosynthesis of plants such as Irgarol and Diuron.

Phytoplankton is constantly present in surface water of the ocean, although there is a difference in abundance. Further, as described in Patent Document 1 and Non-Patent Document 1, the amount of change in fluorescence intensity and the fluorescence quantum efficiency can be measured within a few seconds by holding test water containing phytoplankton in an optical sensor unit of the measuring machine and pulse-irradiating the test water with chlorophyll excitation light having an appropriate intensity.

It is considered that the occurrence of leakage of heavy metals from offshore plants is accidental and contamination with heavy metals at a concentration that causes photosynthesis inhibition in surface seawater in the periphery of the plant is sudden. In a case where surface seawater is contaminated with heavy metals, the amount of change in fluorescence intensity and fluorescence quantum efficiency of the seawater are considered to be lower than those of seawater without contamination with heavy metals in normal times.

CITATION LIST

Patent Literature

[Patent Document 1]
Japanese Unexamined Patent Application, First Publication No. 2006-284335

Non-Patent Documents

[Non-Patent Document 1]
Schreiber, U., 2004. Pulse-Amplitude-Modulation (PAM) Fluorometry and Saturation Pulse Method: An Overview.
[Non-Patent Document 2]
Joshi, M. K., Mohanty, P., 2004. Chlorophyll a Fluorescence as a Probe of Heavy Metal Ion Toxicity in Plants, In: Papageorgiou, G. C., Govindjee (Eds.), Chlorophyll a Fluorescence: A Signature of Photosynthesis. Springer Netherlands, Dordrecht, pp. 637 to 661.
[Non-Patent Document 3]
Sjollema, S. B., MartinezGarcia, G., van der Geest, H. G., Kraak, M. H. S., Booij, P., Vethaak, A. D., Admiraal, W., 2014. Hazard and risk of herbicides for marine microalgae. Environmental Pollution 187, pp. 106 to 111.

SUMMARY OF INVENTION

Technical Problem

However, the amount of change in fluorescence intensity and the fluorescence quantum efficiency of phytoplankton are greatly affected by the intensity of light applied to phytoplankton at the time of collection or before collection, namely the underwater photon flux density. In particular, the natural fluctuation in the amount of change in fluorescence intensity and the fluorescence quantum efficiency of phytoplankton collected from an environment where the underwater photon flux density fluctuates diurnally and daily, such as the ocean surface layer, are large, and thus it is difficult to determine the presence or absence of contamination with a photosynthesis inhibitor by distinguishing the contamination from a change caused by contamination with a photosynthesis inhibitor in natural fluctuation.

Therefore, an object of the present invention is to provide an inexpensive and small-sized device for detecting contamination with a photosynthesis inhibitor that measures the fluorescence quantum efficiency of phytoplankton temporarily collected from surface seawater or the like according to a method of suppressing the natural fluctuation, determines contamination of a test liquid such as seawater with a photosynthesis inhibitor, and fractionates the test liquid suspected to be contaminated with a photosynthesis inhibitor in a storage container, and a simple method for detecting contamination with a photosynthesis inhibitor.

Solution to Problem

The present invention includes the following aspects.

[1] A device for detecting contamination with a photosynthesis inhibitor, the device including a collection device configured to collect a test liquid, a light-blocking pretreatment tank configured to store the test liquid collected by the collection device in a state of containing phytoplankton, a stirring device configured to maintain a floating state of the phytoplankton in the test liquid stored in the pretreatment tank, an irradiation light source configured to irradiate the phytoplankton in the test liquid stored in the pretreatment tank with weak light having an underwater photon flux density that does not cause photoinhibition, a drainage conduit configured to allow the test liquid discharged from the pretreatment tank to flow thereinto, and a fluorescence quantum efficiency measuring machine provided for the drainage conduit and configured to measure a fluorescence quantum efficiency of the phytoplankton in the test liquid discharged from the pretreatment tank.

[2] The device for detecting contamination with a photosynthesis inhibitor according to [1], the device further including a drainage device configured to start, at a time point at which a preset time has elapsed from the start of the irradiation of the test liquid stored in the pretreatment tank with weak light from the irradiation light source, a drainage operation of discharging the test liquid from the pretreatment tank in a preset drainage operation pattern in a state where the irradiation of the test liquid in the pretreatment tank with weak light from the irradiation light source is continued and to stop driving after completion of the drainage, in which the irradiation light source continues the irradiation of the test liquid in the pretreatment tank with weak light until the drainage of the test liquid from the pretreatment tank has been completed.

[3] The device for detecting contamination with a photosynthesis inhibitor according to [2], the device further including a liquid supply conduit provided by being connected to each of a plurality of the pretreatment tanks and configured to guide the test liquid collected by the collection device to the pretreatment tanks from the collection device, and a liquid supply side on-off valve provided in the liquid supply conduit for each of the plurality of pretreatment tanks, in which the drainage conduit includes a drainage pipe for each tank provided for each of the plurality of pretreatment tanks, and a drainage confluent conduit to which a downstream end of the drainage pipe for each tank is connected, the fluorescence quantum efficiency measuring machine is provided for the drainage confluent conduit, the drainage device is a device which realizes drainage control for the test liquid in the pretreatment tanks by a combination operation of opening and closing of a drainage side on-off valve provided in the drainage pipe for each tank and driving and stopping of a discharge pump provided for the drainage confluent conduit, the pretreatment tank that discharges the test liquid by switching the drainage side on-off valve that performs an opening and closing operation is configured to change to one pretreatment tank selected from the plurality of pretreatment tanks, one or more of the liquid supply side on-off valves selected from those of the liquid supply conduits corresponding to the pretreatment tanks other than the pretreatment tank to perform drainage are opened from completion of the storage until completion of the drainage in one pretreatment tank selected from the plurality of pretreatment tanks, and the supply of the test liquid to the pretreatment tank from the collection device through the liquid supply conduit where the liquid supply side on-off valve in an open state is positioned is started.

[4] The device for detecting contamination with a photosynthesis inhibitor according to any one of [1] to [3], the device further including an alarm output device configured to output an alarm and data information in a case where the fluorescence quantum efficiency measured by the fluorescence quantum efficiency measuring machine is lower than a preset value.

[5] The device for detecting contamination with a photosynthesis inhibitor according to any one of [1] to [4], the device further including a branch discharge conduit branched from the drainage conduit and configured to allow the test liquid discharged from one or all of the plurality of pretreatment tanks to flow thereinto through the drainage conduit, and a sample fractionation device provided for the branch discharge conduit and configured to allow the test liquid flowing in the branch discharge conduit to flow into a storage container from the branch discharge conduit when the fluorescence quantum efficiency measured by the fluorescence quantum efficiency measuring machine is lower than a preset value.

[6] A method for detecting contamination with a photosynthesis inhibitor, the method including a liquid supply step of supplying a preset storage amount of a test liquid at a preset time in a light-blocking pretreatment tank while irradiating phytoplankton in the test liquid with weak light having an underwater photon flux density that does not cause photoinhibition, a storing and weak-light irradiation step of stopping the liquid supply of the test liquid to the pretreatment tank at a time at which the storage amount of the test liquid reaches a preset value, and irradiating the test liquid with light having the same underwater photon flux density as that in the liquid supply step for a preset time starting from the time at which the liquid supply is stopped, and a fluorescence quantum efficiency measurement step of irradiating the test liquid in the pretreatment tank with light having the same underwater photon flux density as that in the storing and weak-light irradiation step, discharging the test liquid from the pretreatment tank through a drainage conduit, and measuring a fluorescence quantum efficiency by sequentially irradiating, with measurement light and saturated pulse light, the test liquid remaining in the drainage conduit when flow of the test liquid into the drainage conduit is stopped during a discharge period of the pretreatment tank, after completion of the storing and weak-light irradiation step. [7] The method for detecting contamination with a photosynthesis inhibitor according to [6], in which the fluorescence quantum efficiency measurement step is a step of repeating both of a drainage operation for discharging the test liquid from the pretreatment tank through the drainage conduit, and a measurement operation for measuring the fluorescence quantum efficiency by sequentially irradiating, with measurement light and saturated pulse light, the test liquid remaining in the drainage conduit when the discharge is stopped, for two or more times during a period in which the test liquid remains in the pretreatment tank.

[8] The method for detecting contamination with a photosynthesis inhibitor according to [6] or [7], in which a series of steps from the liquid supply step to the fluorescence quantum efficiency measurement step are repeatedly performed by combining one or a plurality of the pretreatment tanks, and a temporal change in fluorescence quantum efficiency of a plurality of test liquids collected at different times is measured.

[9] The method for detecting contamination with a photosynthesis inhibitor according to any one of [6] to [8], in which, based on a preset fluorescence quantum efficiency or a fluorescence quantum efficiency less than a lower limit of a fluctuation range of fluorescence quantum efficiencies of a plurality of test liquids that do not contain a photosynthesis inhibitor having an inhibitory effect on photosynthesis of the phytoplankton in the test liquids or contain the photosynthesis inhibitor at a concentration less than the concentration at which the inhibitory effect is exhibited, a decrease in fluorescence quantum efficiency of another test liquid which occurs in a case where the test liquid contains the photosynthesis inhibitor at a concentration greater than or equal to the concentration at which the inhibitory effect is exhibited is determined.

Advantageous Effects of Invention

According to the present invention, it is possible to provide an inexpensive and small-sized device for detecting contamination with a photosynthesis inhibitor that semi-continuously measures the fluorescence quantum efficiency of phytoplankton contained in a test liquid such as seawater collected with time and determines the presence or absence of sudden contamination with heavy metals in the test liquid measured semi-continuously, and a simple method for detecting contamination with a photosynthesis inhibitor.

DESCRIPTION OF EMBODIMENTS

Figure 1:
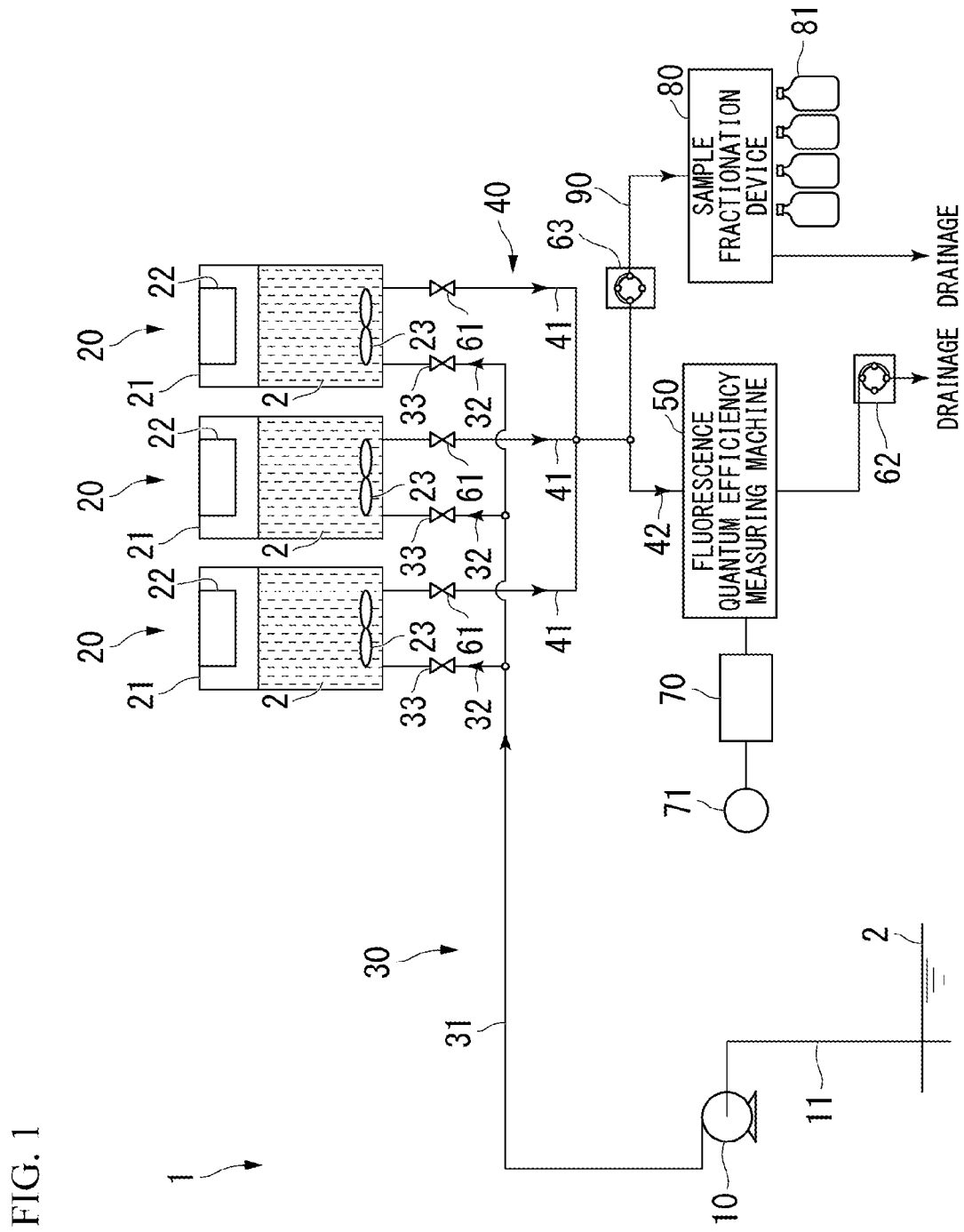
FIG. 1 is a view schematically showing a configuration of a device 1 for detecting contamination with a photosynthesis inhibitor.

[Device for Detecting Contamination with Photosynthesis Inhibitor]

A device for detecting contamination with a photosynthesis inhibitor according to an embodiment of the present invention will be described using a device 1 for detecting contamination with a photosynthesis inhibitor shown in FIG. 1 as an example.

The device 1 for detecting contamination with a photosynthesis inhibitor includes a pump 10 (collection device) that collects a test liquid 2, one or more pretreatment devices 20 that perform a pretreatment on the test liquid 2, a liquid supply conduit 30 that guides the test liquid to the pretreatment device 20 from the pump 10, a drainage conduit 40 that discharges the test liquid 2 from the pretreatment device 20, a fluorescence quantum efficiency measuring machine 50 that measures the fluorescence quantum efficiency of phytoplankton in the test liquid 2 which has been subjected to the pretreatment, and an alarm output device 70 that outputs an alarm. Further, the device 1 for detecting contamination with a photosynthesis inhibitor also includes a branch discharge conduit 90 that branches the test liquid 2 from the drainage conduit 40, a sample fractionation device 80 that fractionates the test liquid 2, and a control device (not shown) that controls the operation of the entire device.

A suction pipe 11 is connected to a suction opening of the pump 10 shown in FIG. 1. The pump 10 supplies the test liquid 2 sucked through the suction pipe 11 to the liquid supply conduit 30 from a discharge opening.

The liquid supply conduit 30 includes a liquid supply main pipe 31 connected to the discharge opening of the pump 10, and a plurality of branch liquid supply pipes 32 which are branched from the liquid supply main pipe 31 and each end of which is connected to each pretreatment device 20. Each branch liquid supply pipe 32 is provided with a liquid supply side on-off valve 33.

The liquid supply conduit 30 guides the test liquid 2 discharged from the discharge opening of the pump 10 and supplied to the liquid supply main pipe 31 to the pretreatment device 20 through the branch liquid supply pipe 32.

Each pretreatment device 20 includes a light-blocking pretreatment tank 21 that stores the test liquid 2, a stirring device 23 that maintains a floating state of phytoplankton contained in the test liquid 2 stored in the pretreatment tank 21, and an irradiation light source 22 that irradiates the test liquid 2 stored in the pretreatment tank 21 with weak light. One branch liquid supply pipe 32 that supplies the test liquid 2 into each pretreatment tank 21 is connected to each pretreatment tank 21. The test liquid 2 supplied to the liquid supply main pipe 31 from the pump 10 is supplied into the pretreatment tank 21 through the liquid supply side on-off valve 33 in an open state and the branch liquid supply pipe 32.

The stirring device 23 of the pretreatment tank 21 stirs the test liquid 2 in the pretreatment tank 21 to maintain the floating state of the phytoplankton in the test liquid 2.

The pretreatment performed by the pretreatment device 20 before the measurements of the fluorescence quantum efficiency is a treatment of irradiating the test liquid 2 in the pretreatment tank 21 with weak light having an underwater photon flux density that does not cause photoinhibition in phytoplankton of the test liquid in a state where the test liquid 2 contains phytoplankton.

Here, photoinhibition indicates a decrease in photosynthetic function that occurs in a case where light energy exceeding the consumption of chloroplasts is supplied. It is considered that hydrogen peroxide and active oxygen are generated inside the cells due to the excessive light energy of strong light, which causes inactivation of photosynthetic enzymes and damage to the chloroplasts.

The photoinhibition is considered to be one factor that decreases the daytime fluorescence quantum efficiency of phytoplankton present on the ocean surface layer. It is considered that the phytoplankton subjected to photoinhibition recovers both the photosynthetic function and the fluorescence quantum efficiency by being irradiated with weak light having an underwater photon flux density that does not cause photoinhibition.

As will be described below in examples, the diurnal fluctuation in the fluorescence quantum efficiency of phytoplankton can be reduced by setting the weak light applied to the phytoplankton in the pretreatment as light having an underwater photon flux density of 300 $\mu mol/m^2/sec$ or less. The intensity of the weak light applied to the phytoplankton in the pretreatment can be preset so as to reduce the diurnal fluctuation in the fluorescence quantum efficiency. The intensity of the weak light applied to the phytoplankton in the pretreatment may be the intensity of weak light having an underwater photon flux density that does not cause photoinhibition in the phytoplankton of the test liquid.

The drainage conduit 40 includes a drainage pipe 41 for each tank that is connected to the pretreatment tank 21 of each pretreatment device 20 and a drainage confluent conduit 42 in which the upstream end of the drainage pipe 41 for each tank on a side of the pretreatment tank 21 and the downstream end thereof on a side opposite to the upstream end are connected to each other. The drainage pipe 41 for each tank of the drainage conduit 40 is provided with a drainage side on-off valve 61.

The device 1 for detecting contamination with a photosynthesis inhibitor includes liquid supply side on-off valves 33 and drainage side on-off valves 61. In FIG. 1, each liquid supply side on-off valve 33 is provided at the end portion (downstream side end portion) of the branch liquid supply pipe 32. Each drainage side on-off valve 61 is provided at the upstream side end portion of the drainage pipe 41 for each tank.

A first discharge pump 62 (discharge pump) is connected to the downstream of the fluorescence quantum efficiency measuring machine 50 in the drainage confluent conduit 42.

The first discharge pump 62 sucks the test liquid 2 through the drainage pipe 41 for each tank, the drainage confluent conduit 42, and the fluorescence quantum efficiency measuring machine 50 from the pretreatment tank 21 having the drainage side on-off valve 61 in an open state and discharges the test liquid to the outside of the device 1 for detecting contamination with a photosynthesis inhibitor. A device that realizes drainage control by a combination operation of opening and closing of the drainage side on-off valve 61 and driving and stopping of the first discharge pump 62 is referred to as a drainage device. However, the first discharge pump 62 is stopped during the measurement of the fluorescence intensity using the fluorescence quantum efficiency measuring machine 50 and for several seconds before and after the measurement.

The fluorescence quantum efficiency measuring machine 50 includes a data-processing unit (not shown) and is connected in the middle of the drainage confluent conduit 42. The fluorescence quantum efficiency measuring machine 50 sequentially irradiates the test liquid 2 on the drainage confluent conduit 42 with measurement light and saturated pulse light and measures the fluorescence intensity in both cases. Subsequently, the data-processing unit (not shown) calculates the fluorescence quantum efficiency from the measured fluorescence intensity.

The alarm output device 70 includes a speaker 71 (not shown) that outputs an alarm and is connected to the fluorescence quantum efficiency measuring machine 50. The alarm output device 70 outputs an alarm from the speaker 71 in a case where the fluorescence quantum efficiency measured by the fluorescence quantum efficiency measuring machine 50 is lower than a preset value.

The branch discharge conduit 90 is branched from a portion on an upstream side of the fluorescence quantum efficiency measuring machine 50 in the drainage confluent conduit 42. A second discharge pump 63 and the sample fractionation device 80 are provided in the middle of the branch discharge conduit 90. In a direction in which the branch discharge conduit 90 extends, the second discharge pump 63 is provided on the upstream side (drainage confluent conduit 42 side) of the branch discharge conduit 90 with respect to the sample fractionation device 80.

The second discharge pump 63 sends the test liquid 2 that is present on the upstream side of the second discharge pump 63 in the direction in which the branch discharge conduit 90 extends to the downstream side from the second discharge pump 63.

A plurality of storage containers 81 used for storing the test liquid are detachably connected to the sample fractionation device 80.

The sample fractionation device 80 includes a switching valve provided in the middle of the drainage confluent conduit 42 and a fractionation channel provided so as to be connectable to the drainage confluent conduit 42 through the switching valve.

The downstream end of the fractionation channel opposite to the upstream end on the switching valve side is connected to the storage container 81.

The switching valve switches a first state in which a portion on the upstream side of the switching valve communicates with a portion on the downstream side of the switching valve in the direction in which the branch discharge conduit 90 extends and a second state in which a portion on the upstream side of the switching valve communicates with the fractionation channel in the direction in which the branch discharge conduit 90 extends.

The device 1 for detecting contamination with a photosynthesis inhibitor starts the operation in a state where the switching valve of the sample fractionation device 80 enters the first state. The device 1 for detecting contamination with a photosynthesis inhibitor switches the state of the switching valve from the first state to the second state in a case where the fluorescence quantum efficiency measured by the fluorescence quantum efficiency measuring machine 50 is lower than a preset value. In a case where the switching valve enters the second state, the test liquid 2 flowing in the branch discharge conduit 90 flows into the storage container 81 from the branch discharge conduit 90 through the fractionation channel. In a case where the amount of the test liquid 2 to flow into the storage container 81 reaches a preset amount, the sample fractionation device 80 allows the switching valve to return to the first state from the second state so that the flow of the test liquid 2 into the storage container 81 is stopped. As a result, a preset amount of the test liquid 2 is stored in the storage container 81.

The branch discharge conduit 90 and the sample fractionation device 80 are configured such that the test liquid 2 in which the fluorescence quantum efficiency measured by the fluorescence quantum efficiency measuring machine 50 is lower than a preset value and the test liquid 2 flowing into the drainage confluent conduit 42 from the pretreatment tank 21 of the pretreatment device 20 and branched to the branch discharge conduit 90 from the drainage confluent conduit 42 flow into the storage container 81 and are stored therein.

After the switching valve is returned from the second state to the first state, the storage container 81 connected to the downstream end of the fractionation channel is replaced. For example, an empty storage container 81 is connected to the downstream end of the fractionation channel.

The switching valve that has returned from the second state to the first state is switched from the first state to the second state in a case where the fluorescence quantum efficiency measured by the fluorescence quantum efficiency measuring machine 50 is less than a preset value.

Hereinafter, a method for detecting contamination with a photosynthesis inhibitor using the device 1 for detecting contamination with a photosynthesis inhibitor will be described.

The device 1 for detecting contamination with a photosynthesis inhibitor first collects the test liquid 2 using the pump 10. The test liquid 2 collected by the pump 10 passes through the liquid supply main pipe 31 through the liquid supply conduit 30, passes through the liquid supply side on-off valve 33 in an open state, and flows into the pretreatment tank 21 of the pretreatment device 20 from the branch liquid supply pipe 32 provided with the liquid supply side on-off valve 33 in an open state. The drainage side on-off valve 61 corresponding to the pretreatment tank 21 into which the test liquid 2 flows is in a closed state.

The above-described step of collecting the test liquid 2 using the pump 10 and supplying the test liquid to the pretreatment tank 21 is referred to as a liquid supply step. In the pretreatment tank 21 in the liquid supply step, the irradiation light source 22 irradiates phytoplankton in the test liquid 2 with weak light having an underwater photon flux density that does not cause photoinhibition.

In a case where the storage amount of the test liquid 2 flowing into the pretreatment tank 21 from the liquid supply conduit 30 reaches a preset value in a preset time, the liquid supply side on-off valve 33 is closed, and liquid supply of the test liquid 2 to the pretreatment tank 21 is stopped, and the state where the preset storage amount of the test liquid is maintained is continued for a preset time starting from the time at which the liquid supply is stopped. During this time, the phytoplankton in the test liquid 2 of the pretreatment tank 21 is irradiated with weak light having the same underwater photon flux density as that in the liquid supply step using the irradiation light source 22 of the pretreatment device 20. This step is referred to as a storing and weak-light irradiation step. The storing and weak-light irradiation step starts from the time at which the liquid supply is stopped and is continued until immediately before the test liquid 2 in the pretreatment tank 21 in which the liquid supply step has been completed starts to be drained as described above.

The preset time starting from the above-described time at which the liquid supply is stopped may be set to be in a range of 30 to 60 minutes.

After completion of the storing and weak-light irradiation step, a fluorescence quantum efficiency measurement step of discharging the test liquid 2 from the pretreatment tank 21 through the drainage conduit 40, and sequentially irradiating the test liquid 2 in the drainage conduit 40 with measurement light and saturated pulse light to measure the fluorescence quantum efficiency is performed.

In the fluorescence quantum efficiency measurement step, first, the discharge of the test liquid 2 from the pretreatment tank 21 to the drainage conduit 40 is started by opening the drainage side on-off valve 61 after the completion of the storing and weak-light irradiation step. Here, the opening of the drainage side on-off valve 61 and the discharge of the test liquid 2 from the pretreatment tank 21 to the drainage conduit 40 by the opening of the drainage side on-off valve are performed while the test liquid in the pretreatment tank 21 is irradiated with light having the same underwater photon flux density as that in the storing and weak-light irradiation step.

Further, in the fluorescence quantum efficiency measurement step, during a period (discharge period) in which the discharge of the test liquid 2 to the drainage conduit 40 from the pretreatment tank 21 is started by opening the drainage side on-off valve 61 and driving the first discharge pump 62 and the total amount of the test liquid 2 in the pretreatment tank 21 is completely discharged, the fluorescence quantum efficiency is measured by stopping the flow of the test liquid 2 into the drainage conduit 40 from the pretreatment tank 21 by temporarily stopping the drive of the first discharge pump 62 and sequentially irradiating the test liquid remaining in the drainage conduit 40 with measurement light and saturated pulse light.

Hereinafter, the measurement operation of the fluorescence quantum efficiency measuring machine 50 that measures the fluorescence quantum efficiency by sequentially irradiating the test liquid 2 in the drainage conduit 40 with measurement light and saturated pulse light will be referred to as a efficiency measurement operation.

The irradiation of the test liquid 2 in the drainage conduit 40 with measurement light and saturated pulse light is performed during the time at which the drive of the first discharge pump 62 is temporarily stopped. In a case where the fluorescence quantum efficiency measuring machine performs irradiation of the test liquid 2 in the drainage conduit 40 with measurement light and saturated pulse light in the efficiency measurement operation, the drainage side on-off valve 61 may be in an open state or may be closed in accordance with the stopping of the drive of the first discharge pump 62.

Further, in a case where the flow of the test liquid 2 into the drainage conduit 40 from the pretreatment tank 21 is stopped by stopping the first discharge pump 62 before the end of the drainage period after the discharge of the test liquid 2 to the drainage conduit 40 from the pretreatment tank 21 is started by opening the drainage side on-off valve 61 after the completion of the storing and weak-light irradiation step, the drainage device allows the first discharge pump to be driven again after completion of the irradiation of the test liquid 2 in the drainage conduit 40 with measurement light and saturated pulse light and restarts the discharge of the test liquid to the drainage conduit 40 from the pretreatment tank 21.

In a case where the test liquid 2 remains in the pretreatment tank 21 after the measurements of the fluorescence quantum efficiency has been completed by the efficiency measurement operation carried out once or a plurality of times, the residual liquid in the pretreatment tank 21 is discharged by driving the first discharge pump 62 in a state where the drainage side on-off valve 61 is opened.

The test liquid 2 containing the pretreated phytoplankton flows into the fluorescence quantum efficiency measuring machine 50 from the pretreatment tank 21 through the drainage confluent conduit 42. In the fluorescence quantum efficiency measuring machine 50, the fluorescence quantum efficiencies of the test liquid 2 containing phytoplankton are measured as follows.

In a case where the phytoplankton is irradiated with light, chlorophyll absorbs the light, a part of the light energy is transferred to the photosystem, and a part thereof is emitted as fluorescence. In the embodiment, the fluorescence quantum efficiency ($F_v'/F_m'$) is calculated based on the measured value measured by the following measurement operation.

First, the test liquid 2 remaining in the drainage confluent conduit 42 is irradiated with measurement light, and the fluorescence intensity ($F_o'$) is measured. Subsequently, the test liquid 2 containing phytoplankton is irradiated with saturated pulse light. At this time, the fluorescence intensity ($F_m'$) is measured. Subsequently, in the data-processing unit (not shown), a difference between $F_m'$ and $F_o'$ ($F_m'-F_o'$) is calculated as the amount of change in fluorescence quantum intensity ($F_v'$), and the fluorescence quantum efficiency ($F_v'/F_m'$) is further calculated.

As described above, the drainage device realizes a combination operation of opening and closing of the drainage side on-off valve 61 and driving and stopping of the first discharge pump 62. The first discharge pump 62 is not particularly limited, and examples thereof include a centrifugal pump and a tubing pump.

In a case where the first discharge pump 62 is, for example, a centrifugal pump, the drainage device is operated in the following manner in the fluorescence quantum efficiency measurement step.

The fluorescence quantum efficiency measurement step is a step of repeating both a drainage operation for discharging the test liquid 2 from the pretreatment tank 21 through the drainage conduit 40 (opening of the drainage side on-off valve 61 and driving of the first discharge pump 62) and a measurement operation for measuring the fluorescence quantum efficiency by sequentially irradiating, with measurement light and saturated pulse light, the test liquid 2 remaining in the drainage conduit 40 (specifically, the drainage confluent conduit 42) in a case where the discharge of the test liquid 2 is stopped due to the stopping of the first discharge pump 62 driven by the drainage operation and the closing of the drainage side on-off valve 61, two or more times during the discharge period.

The average value, the standard deviation, and the like of the fluorescence quantum efficiency may be calculated from the measured values of a plurality of fluorescence quantum efficiencies.

However, the fluorescence quantum efficiency measurement step may be a step of performing the drainage operation (opening of the drainage side on-off valve 61 and driving the first discharge pump 62) and the above-described measurement operation carried out by stopping the first discharge pump 62 and closing the drainage side on-off valve 61 to stop the discharge of the test liquid 2, only once during the discharge period.

Further, in a case where the first discharge pump 62 is, for example, a tubing pump, the drainage device operates in the following manner in the fluorescence quantum efficiency measurement step.

The fluorescence quantum efficiency measurement step is a step of repeating both a drainage operation for discharging the test liquid 2 from the pretreatment tank 21 through the drainage conduit 40 (opening of the drainage side on-off valve 61 and driving of the first discharge pump 62) and a measurement operation for measuring the fluorescence quantum efficiency by sequentially irradiating, with measurement light and saturated pulse light, the test liquid 2 remaining in the drainage conduit 40 (specifically, the drainage confluent conduit 42) in a case where the discharge of the test liquid 2 is stopped due to the stopping of the first discharge pump 62 driven by the drainage operation and the closing of the drainage side on-off valve 61, two or more times during the discharge period.

The average value, the standard deviation, and the like of the fluorescence quantum efficiency may be calculated from the measured values of a plurality of fluorescence quantum efficiencies.

However, the fluorescence quantum efficiency measurement step may be a step of performing the drainage operation (opening of the drainage side on-off valve 61 and driving the first discharge pump 62) and the above-described measurement operation carried out by stopping the first discharge pump 62 and closing the drainage side on-off valve 61 to stop the discharge of the test liquid 2, only once during the discharge period.

In the case where the first discharge pump 62 is a tubing pump, the drainage side on-off valve 61 may be continuously in an open state during the measurement operation for the fluorescence quantum efficiency.

In the case where the first discharge pump 62 is a centrifugal pump, a flow rate controller such as an electromagnetic variable valve may be installed in the drainage confluent conduit 42 in order to adjust the amount of the test liquid 2 flowing through the drainage pipe 41 for each tank and the drainage confluent conduit 42.

In the case where the first discharge pump 62 is a tubing pump, the first discharge pump 62 can discharge the test liquid 2 at a preset flow rate.

In the case where the first discharge pump 62 is a tubing pump, the state where the drainage side on-off valve 61 is opened can be continued and the flow of the test liquid 2 in the drainage pipe 41 for each tank and the drainage confluent conduit 42 can be stopped in a case where the first discharge pump 62 is stopped.

In a case where the test liquid 2 remains in the pretreatment tank 21 after the measurement of the fluorescence quantum efficiency of the test liquid 2 in the pretreatment tank 21 provided with the drainage side on-off valve 61 in an open state has been completed, the irradiation light source 22 of the pretreatment tank 21 may stop the irradiation of the test liquid with weak light.

Until the discharge of the remaining test liquid 2 has been completed, the driving of the first discharge pump and the opening of the drainage side on-off valve 61 of the pretreatment tank 21 of the remaining test liquid 2 are continued.

Further, the start of the drainage operation of the drainage device, the temporal stop and restart of the drainage operation during a period for the efficiency measurement operation, and the completion discharge of the test liquid 2 in the pretreatment tank 21 after the completion of the efficiency measurement operation carried out once or a plurality of times in the fluorescence quantum efficiency measurement step are realized by presetting the operation patterns of the drainage side on-off valve 61 and the first discharge pump 62 in the control device (not shown) that controls the entire device.

The operation patterns set for the drainage side on-off valve 61 and the first discharge pump 62 are as follows. In a case where the fluorescence quantum efficiency measurement step is started, the drainage side on-off valve 61 is opened, the first discharge pump 62 is driven, and the drainage device starts the drainage operation. Next, the drainage operation is temporarily stopped at a time interval set in the operation pattern. While the drainage operation is stopped, the drive of the first discharge pump 62 is stopped, and the drainage side on-off valve 61 continues the open state or enters a closed state depending on the kind of the first discharge pump 62. The fluorescence quantum efficiency is measured while the drainage operation is stopped. After the number of times of stopping the drainage operation and measuring the fluorescence quantum efficiency reaches the number of times set in the operation pattern, the drainage operation of the drainage device is continued until the test liquid 2 in the pretreatment tank 21 is completely discharged (opening of the drainage side on-off valve 61 and driving of the first discharge pump 62). After the completion of the discharge (a state in which the test liquid 2 in the pretreatment tank 21 is exhausted), the drainage device stops the first discharge pump 62 and closes the drainage side on-off valve 61.

In a case where two or more pretreatment devices 20 are provided and the storage maintenance period of the test liquid 2 in the pretreatment tank 21 of one of the pretreatment devices has elapsed, that is, the storing and weak-light irradiation step has been carried out, the drainage side on-off valve 61 provided corresponding to the pretreatment tank 21 in which the storing and weak-light irradiation step has been completed is opened (drainage operation), and the drainage side on-off valves 61 provided on other pretreatment tanks 21 are closed. That is, only the drainage side on-off valve 61 provided in the pretreatment tank 21 in which the storing and weak-light irradiation step has been completed is opened.

The state of the drainage device that performs the drainage operation (opening of the drainage side on-off valve 61) is switched in a state in which the drainage of the test liquid 2 in the pretreatment tank 21 provided with the drainage side on-off valve 61 in an open state has been completed and the storing and weak-light irradiation step for the test liquid 2 in other pretreatment tanks 21 is completed. Specifically, the drainage side on-off valve 61 provided in the pretreatment tank 21 in which the drainage has been completed is closed, the drainage side on-off valve 61 provided in the pretreatment tank 21 containing the test liquid 2 in which the storing and weak-light irradiation step has been completed is opened, and the drainage side on-off valves 61 provided in other pretreatment tanks 21 are closed.

In the pretreatment tank 21 that drains the test liquid 2, the phytoplankton is irradiated with light having the same underwater photon flux density as in the liquid supply step and the storing and weak-light irradiation step.

The test liquid 2 in the pretreatment tank 21 in which the drainage side on-off valve 61 is opened flows into the drainage confluent conduit 42 through the drainage pipe 41 for each tank which is connected to the pretreatment tank 21. While the test liquid 2 of one pretreatment tank 21 is discharged, the drainage side on-off valves 61 provided in the pretreatment tanks 21 other than the pretreatment tank 21 during drainage are closed so that the drainage is stopped. Therefore, flow of mixed liquids drained from the plurality of pretreatment tanks into the drainage confluent conduit 42 does not occur.

In the pretreatment tank 21 in which the drainage has been completed, the drainage side on-off valve 61 is closed, the liquid supply side on-off valve 33 is opened, the test liquid 2 passes through the branch liquid supply pipe 32 provided with the opened liquid supply side on-off valve 33, and flow of the test liquid into the pretreatment tank 21 to which the branch liquid supply pipe 32 is connected is started.

The stirring device 23 of the pretreatment tank 21 stirs the test liquid 2 in the pretreatment tank 21 to maintain the floating state of the phytoplankton in the test liquid 2. It is preferable that the stirring be continued from the start of the liquid supply step to immediately before the end of the fluorescence quantum efficiency measurement step. Due to the continuous stirring of the test liquid 2, the phytoplankton in the test liquid 2 is uniformly irradiated with weak light, and the properties of the test liquid 2 to be supplied to the fluorescence quantum efficiency measuring machine 50 and the sample fractionation device 80 are more homogenized.

The stirring of the test liquid 2 carried out by driving the stirring device 23 may not necessarily be continuous driving (stirring) from the start of the liquid supply step to the end of the fluorescence quantum efficiency measurement step. For example, the stirring of the test liquid 2 carried out by driving the stirring device 23 may not be provided in the latter half of the preset time for the fluorescence quantum efficiency measurement step. However, it is preferable that the stirring of the test liquid 2 carried out by driving the stirring device 23 be performed from the start of the liquid supply step to the end of the fluorescence quantum efficiency measurement step, at least in the latter half of the preset time for the liquid supply step and in the first half of the preset time for the fluorescence quantum efficiency measurement step.

The test liquid 2 in the device 1 for detecting contamination with a photosynthesis inhibitor may be any liquid as long as the liquid does not destroy phytoplankton in a state where contamination with a photosynthesis inhibitor does not occur and in an environment of the pretreatment tank 21, the conduit, or the like of the device 1 for detecting contamination with a photosynthesis inhibitor. Examples of the test liquid 2 include seawater, river water, and lake water which contain phytoplankton. In a case of detecting contamination with a photosynthesis inhibitor in groundwater, hot spring water, rainwater, sewage, industrial wastewater, and the like that do not contain phytoplankton, it is preferable that phytoplankton which is not destroyed even in a case of being mixed with these liquids in a state where contamination with a photosynthesis inhibitor has not occurred be mixed with these liquids collected by the pump 10 and used as the test liquid 2 in the device 1 for detecting contamination with a photosynthesis inhibitor.

As will be described below in the examples, in a case where the test liquid 2 is contaminated with heavy metals, the fluorescence quantum efficiency of phytoplankton after being irradiated with weak light is decreased. In a case where the test liquid 2 is seawater near the sea-floor hydrothermal deposits, environmental water near ground metal mines, industrial wastewater, or the like, examples of the photosynthesis inhibitor which can contaminate the water include heavy metals.

In a case where the test liquid 2 is seawater, it is preferable that the seawater to be collected be seawater containing phytoplankton. In seawater, as the water depth increases, the illuminance decreases and the number of phytoplankton that perform photosynthesis decreases. Further, in order to measure the fluorescence quantum efficiency, it is preferable that the concentration of phytoplankton be (0.1 µg/L or greater in terms of the concentration of chlorophyll a). In order to collect seawater that contains phytoplankton having a concentration sufficient for measurements of the fluorescence quantum efficiency, the seawater collected in the present embodiment is preferably seawater at a depth of 0 to 150 m and more preferably surface water.

In general, phytoplankton can reduce the diurnal fluctuation in fluorescence quantum efficiency by being irradiated with weak light (for example, see Non-Patent Document 2). As will be described below in the examples, contamination of the test liquid 2 with heavy metals decreases the fluorescence quantum efficiency of phytoplankton after irradiation with weak light. The device 1 for detecting contamination with a photosynthesis inhibitor and the method for detecting contamination with a photosynthesis inhibitor can be used for detecting contamination with heavy metals.

In a case where the substance that has contaminated the test liquid 2 is a photosynthesis inhibitor which decreases the fluorescence quantum efficiency of phytoplankton after being irradiated with weak light, the contamination with a photosynthesis inhibitor can be detected using the device 1 for detecting contamination with a photosynthesis inhibitor and the method for detecting contamination with a photosynthesis inhibitor, similar to the detection of contamination with heavy metals.

Whether or not contamination with a specific chemical substance or the like that is expected to contaminate the test liquid can be detected can be investigated in advance by adding the substance to the test liquid 2 containing phytoplankton and performing a test of measuring the fluorescence quantum efficiency of the phytoplankton after being irradiated with weak light.

Examples of the kinds of photosynthesis inhibitor that can be detected for contamination include heavy metals such as zinc and lead as will be described below in the examples.

Further, Non-Patent Document 3 describes that the fluorescence quantum efficiency of marine phytoplankton is decreased due to a pesticide that directly inhibits photosynthesis of plants such as Irgarol and Diuron. Examples of the photosynthesis inhibitor include the above-described pesticides, but the examples are not limited thereto.

The test liquid 2 may contain one or a plurality of the photosynthesis inhibitors described above.

The device 1 for detecting contamination with a photosynthesis inhibitor and the method for detecting contamination with a photosynthesis inhibitor can be used for detecting contamination with a photosynthesis inhibitor expected to contaminate the test liquid 2 that is expected to be apparently contaminated with a photosynthesis inhibitor, such as seawater near sea-floor hydrothermal deposits or industrial wastewater.

In a case where the photosynthesis inhibitor that is expected to contaminate the test liquid 2 is unknown, the photosynthesis inhibitor that has contaminated the test liquid 2 can be synthesized and identified by analyzing the test liquid 2 in the storage container 81 which has been collected by the sample fractionation device 80 in a case where a decrease in fluorescence quantum efficiency is detected by the device 1 for detecting contamination with a photosynthesis inhibitor.

The place where the device 1 for detecting contamination with a photosynthesis inhibitor is installed is not particularly limited, and examples thereof include land and ships near the test liquid 2. By installing the device 1 for detecting contamination with a photosynthesis inhibitor on a ship, seawater containing phytoplankton can be collected as the test liquid 2 by the pump 10.

By measuring changes in fluorescence quantum efficiency of seawater collected with time, contamination of seawater with a photosynthesis inhibitor can be detected. For example, leakage of heavy metals from an offshore plant into seawater can be detected by measuring the fluorescence quantum efficiency of seawater near the offshore plant for developing sea-floor mineral resources with time.

The concentration of the photosynthesis inhibitor that can be detected by the device 1 for detecting contamination with a photosynthesis inhibitor is at a concentration level that decreases the fluorescence quantum efficiency of phytoplankton. In a case where the phytoplankton supplied as the test liquid 2 is seawater collected from an ocean environment in a natural state, the concentration level of the photosynthesis inhibitor in which it is determined, by the device 1 for detecting contamination with a photosynthesis inhibitor and the determination method, that contamination with the photosynthesis inhibitor has occurred corresponds to a high concentration level that can cause photosynthesis inhibition or growth inhibition with respect to the phytoplankton community constituting the ocean ecosystem of an ocean environment from which seawater has been collected.

On the contrary, the concentration level of the photosynthesis inhibitor in which it is not determined that contamination with the photosynthesis inhibitor has occurred corresponds to a low concentration level that is unlikely to cause photosynthesis inhibition or growth inhibition with respect to the phytoplankton community in the ocean environment.

Further, in a case where the liquid collected by the pump 10 does not contain phytoplankton and the collected liquid is mixed with a specific species of phytoplankton obtained by culturing or the like to obtain the test liquid 2, the concentration level for determining the presence or absence of contamination can be known in advance using the device 1 for detecting contamination with a photosynthesis inhibitor and the determination method by preliminarily grasping the amount of the decrease in fluorescence quantum efficiency of the mixed phytoplankton species with respect to different levels of the concentrations of the photosynthesis inhibitor.

According to the device 1 for detecting contamination with a photosynthesis inhibitor, contamination with the photosynthesis inhibitor can be more easily detected as compared with a chemical analysis method. Further, in a case where the photosynthesis inhibitor that is expected to contaminate the test liquid is a heavy metal, the device for detecting contamination with a photosynthesis inhibitor of the present invention is cheaper and smaller than a mass spectrometer required for heavy metal analysis. Therefore, it is easy to load the device 1 for detecting contamination with a photosynthesis inhibitor on a ship or the like.

In a case where contamination of an average liquid with a photosynthesis inhibitor in the vicinity of an end of the suction pipe 11 of the device 1 for detecting contamination with a photosynthesis inhibitor for a certain period of time is desired to be determined, it is preferable that collection of the test liquid 2 using the pump 10 be performed at a constant flow rate.

In a case where the test liquid 2 is collected at a constant flow rate, the time for the liquid supply step in one pretreatment tank 21 is determined based on the flow rate and a preset storage amount of the test liquid 2 in the pretreatment tank 21, and the test liquid 2 that is stored in the pretreatment tank 21 after the completion of the liquid supply step and determined whether contamination with heavy metals or the like occurs in the fluorescence quantum efficiency measurement step can have an average quality in the vicinity of the end of the suction pipe 11 during the time for the liquid supply step.

The number of pretreatment tanks 21 of the device 1 for detecting contamination with a photosynthesis inhibitor may be one or more. By sufficiently increasing the number of pretreatment tanks 21 included in the device 1 for detecting contamination with a photosynthesis inhibitor according to the time required for the liquid supply step, the storing and weak-light irradiation step, and the fluorescence quantum efficiency measurement step in one pretreatment tank 21, even in a case where the storing and weak-light irradiation step or discharge of the test liquid 2 in one or a plurality of pretreatment tanks 21 is carried out, a new test liquid 2 can be supplied to the pretreatment tank 21 in which the fluorescence quantum efficiency measurement step has been completed by the pump 10. That is, it is possible to create an operation state of the device 1 for detecting contamination with a photosynthesis inhibitor without a period in which collection of water is stopped.

In the device 1 for detecting contamination with a photosynthesis inhibitor, the operation state without a period in which collection of water is stopped can be created by performing collection of the test liquid 2 using the pump 10 at a constant flow rate and providing a sufficient number of pretreatment tanks 21.

Further, a series of steps from the liquid supply step to the fluorescence quantum efficiency measurement step are repeatedly performed by combining one or a plurality of the pretreatment tanks, and a temporal change in fluorescence quantum efficiency of a plurality of test liquids 2 present in the vicinity of the end of the suction pipe 11 during the time for the liquid supply step and collected at different times can be measured.

It is preferable that the presence or absence of contamination with a photosynthesis inhibitor in the device 1 for detecting contamination with a photosynthesis inhibitor be determined based on a fluorescence quantum efficiency less than a lower limit of a fluctuation range of fluorescence quantum efficiencies of a plurality of test liquids that do not contain a photosynthesis inhibitor having an inhibitory effect on photosynthesis of phytoplankton in the test liquids or contain a photosynthesis inhibitor at a concentration less than the concentration at which the inhibitory effect is exhibited.

The fluorescence quantum efficiency used as a standard for determining whether contamination with a photosynthesis inhibitor occurs can be measured by the device 1 for detecting contamination with a photosynthesis inhibitor using a liquid satisfying the above-described conditions as the test liquid 2. Further, in a case where a liquid satisfying the above-described conditions can be continuously collected, the natural fluctuation range and the lower limit of the fluorescence quantum efficiency in this case can be measured by measuring the fluorescence quantum efficiency with time using the device 1 for detecting contamination with a photosynthesis inhibitor.

It is preferable that determination whether the test liquid is contaminated with a photosynthesis inhibitor be performed by the device 1 for detecting contamination with a photosynthesis inhibitor during a period in which determination whether the test liquid is not contaminated with a photosynthesis inhibitor can be made in a case where the occurrence of contamination with a photosynthesis inhibitor is desired to be monitored.

In a case where contamination with a photosynthesis inhibitor is desired to be monitored, the contamination with a photosynthesis inhibitor can be regularly or continuously monitored by continuously measuring the fluorescence quantum efficiency with time using the device 1 for detecting contamination with a photosynthesis inhibitor in a case where the standard for determination whether contamination with a photosynthesis inhibitor such as a heavy metal occurs is set.

Further, in a case where a period in which it is determined that contamination with heavy metals or the like has not occurred exists during a period in which the presence or absence of continuous contamination with a photosynthesis inhibitor after the standard for determination is set is monitored, the standard for determination whether contamination with a photosynthesis inhibitor has occurred is added as additional data for determining the natural fluctuation range and the lower limit of the fluorescence quantum efficiency in this case based on the fluorescence quantum efficiency during the period.

Since the light applied to the test liquid 2 in the pretreatment tank 21 in the storing and weak-light irradiation step or the like is weak light, it is preferable that the pretreatment tank 21 be a light-blocking treatment tank that is not affected by light incident from the outside.

Further, it is preferable that the drainage conduit 40 and the liquid supply conduit 30 used for the test liquid 2 discharged from the pretreatment tank 21 to reach the fluorescence quantum efficiency measuring machine 50 both have a light-blocking property. In a case where the drainage conduit 40 and the liquid supply conduit 30 do not have a light-blocking property, it is preferable that the intensity of light which can be applied to the drainage conduit 40 and the liquid supply conduit 30 be less than or equal to the light intensity of light to be applied in the weak-light irradiation step.

The fluorescence quantum efficiency of a plant is roughly classified into a value ($F_v'/F_m'$) obtained in a case where the plant is irradiated with light until immediately before the measurement of the fluorescence quantum efficiency by irradiation with saturated pulse light and a value ($F_v/F_m$) obtained by irradiating the plant with saturated pulse light immediately after the plant is held in a dark place for a certain period of time or longer.

The former $F_v'/F_m'$ is measured by the device 1 for detecting contamination with a photosynthesis inhibitor which measures the fluorescence quantum efficiency immediately after the irradiation of the test liquid 2 with weak light. Meanwhile, in a case where the plant is held in a dark place as in the latter case, the fluorescence quantum efficiency is likely to increase due to the progress of oxidation of plastoquinone in the photosystem of the plant. In a case where the plant is held in a dark place for a certain period of time or longer, the oxidation is completely made and the fluorescence quantum efficiency shows the maximum value. The fluorescence quantum efficiency here is referred to as the maximum fluorescence quantum efficiency ($F_v/F_m$).

The maximum fluorescence quantum efficiency ($F_v/F_m$) is calculated using the maximum fluorescence intensity ($F_m$) obtained by performing measurement on the plant held in a dark place and the amount of change in maximum fluorescence intensity ($F_v = F_m - F_o$) acquired from a difference between the maximum fluorescence intensity ($F_m$) and the fluorescence intensity ($F_o$) obtained by irradiation with weak measurement light before the irradiation with saturated pulse light.

It is often reported that the maximum fluorescence quantum efficiency ($F_v/F_m$) of a plant can be typically measured by holding the plant in a dark place for 10 to 60 minutes, but the holding time varies depending on the kind of plant and the like.

The irradiation light source 22 irradiates phytoplankton in the test liquid 2 of the pretreatment tank 21 with weak light having an underwater photon flux density that does not cause photoinhibition. As the irradiation light source, illumination with a light-emitting diode, a fluorescent lamp, or the like can be used, but the irradiation light source is not limited thereto as long as the light source is capable of irradiating light having a wavelength in the photosynthetically active radiation range or light having a predetermined wavelength suitable for photosynthesis of phytoplankton in the test liquid 2.

The physiological state and the fluorescence quantum efficiency of phytoplankton are also affected by a change in water temperature. Therefore, it is preferable that the device 1 for detecting contamination with a photosynthesis inhibitor be installed in an environment where the temperature is close to the temperature at which the phytoplankton in the test liquid 2 is collected or the device has a structure in which the temperature of the test liquid 2 is maintained. Further, it is preferable that a light source that generates less heat be selected as the irradiation light source 22.

As will be described below in Experimental Example 1, the maximum fluorescence quantum efficiency of surface seawater that is not irradiated with weak light has a relationship close to an inverse correlation with the intensity of light applied to phytoplankton in seawater during collection of seawater. In particular, the maximum fluorescence quantum efficiency of surface seawater collected in a case where the photon flux density in air exceeds 300 to 500 µmol/m²/sec significantly decreases as compared to the maximum fluorescence quantum efficiency of surface seawater collected in a case where the photon flux density in air is less than the above-described range.

In addition, as will be described below in Experimental Example 2 and Experimental Example 5, the fluorescence quantum efficiency after irradiation of collected seawater with weak light having an underwater photon flux density of 35 to 300 µmol/m²/sec for 30 to 60 minutes has a suppressed dependence on the intensity of light applied to phytoplankton in seawater during the collection of seawater.

As will be described below in Experimental Example 3, the fluorescence quantum efficiency decreases in several hours in a case where a heavy metal serving as a photosynthesis inhibitor under irradiation with weak light is added to seawater containing phytoplankton such that the concentration thereof is greater than or equal to a certain value. In a case where the concentration of the heavy metal is high, the fluorescence quantum efficiency decreases in a few minutes. Therefore, it is possible to determine whether contamination with the heavy metal occurs in a case where the decrease in the fluorescence quantum efficiency of seawater is less than the fluctuation range of the fluorescence quantum efficiency of seawater that has not been contaminated.

As will be described below in Experimental Example 4, the fluorescence quantum efficiency does not decrease under irradiation with weak light in a case where a heavy metal is added to seawater, but the fluorescence quantum efficiency may not decrease in a dark place. Therefore, in a case where contamination with a heavy metal occurs in a sea area at night, there is a possibility that a decrease in fluorescence quantum efficiency cannot be detected unless irradiation with weak light is performed after collection of seawater.

It is considered that the fluorescence quantum efficiency decreases regardless of the irradiation with weak light after collection of seawater in a case where contamination with a heavy metal occurs in a sea area during the daytime. However, in a case where irradiation with weak light is not carried out, there is a possibility that a natural decrease in fluorescence quantum efficiency that occurs under the sunlight in the daytime and a decrease in fluorescence quantum efficiency due to contamination with a heavy metal cannot be distinguished from each other.

Therefore, the irradiation with weak light is a step required for facilitating determination of the presence of contamination with a heavy metal using the fluorescence quantum efficiency by suppressing the dependence of the fluorescence quantum efficiency on the intensity of light applied to the test liquid during collection of the test liquid and for detecting contamination with a heavy metal which occurs in a dark place based on the measurement of the fluorescence quantum efficiency. The same applies to the determination of the presence of contamination with a photosynthesis inhibitor.

As will be described below in Experimental Example 5, the fluorescence quantum efficiency of seawater irradiated with weak light for 60 minutes does not change significantly even in a case where the seawater is subsequently held in a dark place for approximately 30 minutes. Therefore, in the measurement of the fluorescence quantum efficiency of the test liquid irradiated with weak light, the test liquid is not necessarily held under the same irradiation with weak light until immediately before the measurement and can be held in a dark place.

Meanwhile, the fluorescence quantum efficiency may change in a case where the test liquid is irradiated with strong light after being irradiated with weak light. Therefore, it is considered preferable to use a light-blocked conduit for transfer of the test liquid to the fluorescence quantum efficiency measuring machine from the pretreatment tank for irradiation of the test liquid with weak light.

In order to suppress the fluctuation in the fluorescence quantum efficiency and detect the presence of a heavy metal, it is preferable that the test liquid 2 pass through the drainage pipe 41 for each tank and the drainage confluent conduit 42 in 30 minutes after the storing and weak-light irradiation step and the fluorescence quantum efficiency be measured by the fluorescence quantum efficiency measuring machine 50.

The test liquid 2 flowing down the drainage pipe 41 for each tank and the drainage confluent conduit 42 may be installed under a light-blocking condition or may be irradiated with the same intensity of light as that in the pretreatment.

Appropriate pretreatment conditions for detecting the presence of heavy metals while suppressing fluctuations in the fluorescence quantum efficiency may be appropriately set in consideration of the type of phytoplankton.

The wavelength, the intensity, and the irradiation time of the pulse light to be applied in a case of the measurement of the fluorescence quantum efficiency using the fluorescence quantum efficiency measuring machine 50 can be determined with reference to a known method for measuring the fluorescence quantum efficiency. The spectrum of light to be absorbed and the spectrum of fluorescence vary depending on the kind of phytoplankton. After the phytoplankton to be used is investigated in advance, the wavelength, the intensity, the irradiation time, and the like of the pulse light can be appropriately determined.

In a case where the fluorescence quantum efficiency measured by the fluorescence quantum efficiency measuring machine 50 is lower than a preset value, the test liquid 2 flows through the branch discharge conduit 90 and enters the sample fractionation device 80 to be tested, and the test liquid 2 flows into the storage container 81. The test liquid 2 stored in the storage container 81 can also be used for further analysis such as chemical analysis.

The alarm output device 70 may be any device as long as the device notifies of the presence of a heavy metal in the test liquid 2. For example, the alarm output device 70 may raise an alarm using a speaker, a warning lamp, or the like. Further, the alarm output device 70 may be a device that transmits an alarm through a wireless line, a telecommunication line, or the like.

Further, in a case where an alarm is transmitted through a wireless line or the like, the alarm generation time, the location (the latitude and the longitude), the fluorescence quantum efficiency, and the other data and information measured at the site may be broadcast along with the alarm.

The fluorescence quantum efficiency of the test liquid 2 can be semi-continuously measured by the device 1 for detecting contamination with a photosynthesis inhibitor according to the embodiment. In a case where the test liquid 2 does not contain a heavy metal usually and the test liquid 2 contains a heavy metal in a certain time zone, the device 1 for detecting contamination with a photosynthesis inhibitor can detect the presence of a heavy metal in the test liquid 2 by measuring the fluorescence quantum efficiency.

In a case where the fluorescence quantum efficiency is lower than the usual fluorescence quantum efficiency, the alarm output device 70 outputs an alarm. The range of the value of the fluorescence quantum efficiency that outputs an alarm may be set in advance with reference to the usual fluorescence quantum efficiency.

As a method for detecting contamination with a photosynthesis inhibitor, a method can be employed including a liquid supply step of supplying a preset storage amount of the test liquid 2 at a preset time to the test liquid 2 in the light-blocking pretreatment tank 21 while irradiating phytoplankton in the test liquid 2 with weak light having an underwater photon flux density that does not cause photoinhibition, a storing and weak-light irradiation step of stopping the liquid supply of the test liquid 2 to the pretreatment tank 21 at a time at which the storage amount of the test liquid 2 reaches a preset value and irradiating the test liquid 2 with light having the same underwater photon flux density as that in the liquid supply step for a preset time starting from the time at which the liquid supply is stopped, and a fluorescence quantum efficiency measurement step of discharging the test liquid 2 from the pretreatment tank 21 through a drainage conduit 40 while irradiating the test liquid 2 in the pretreatment tank 21 with light having the same underwater photon flux density as that in the storing and weak-light irradiation step, and measuring the fluorescence quantum efficiency by sequentially irradiating, with measurement light and saturated pulse light, the test liquid 2 remaining in the drainage conduit 40 in a case where flow of the test liquid 2 into the drainage conduit 40 is stopped during a discharge period from the pretreatment tank 21, after completion of the storing and weak-light irradiation step.

The test liquid 2 may be collected manually. The drainage side on-off valve 61 provided in the drainage device may be manually operated. Further, the drainage device may include a pump for draining the test liquid 2 instead of the drainage side on-off valve 61.

In FIG. 1, the liquid supply main pipe 31 is branched into the branch liquid supply pipe 32 in the vicinity of the pretreatment device 20, but this branch point is not limited to the position shown in FIG. 1. For example, the branch point may be on an upstream side of the position shown in FIG. 1.

EXAMPLES

Hereinafter, the present invention will be described based on the examples, but the present invention is not limited to the following examples.

Experimental Example 1

(Natural Fluctuation in Maximum Fluorescence Quantum Efficiency)

The influence of light, applied to phytoplankton during collection, on the maximum fluorescence quantum efficiency of the phytoplankton was analyzed. The analysis was continuously carried out on the Japan Agency for Marine-Earth Science and Technology research vessel Kaimei (voyage number KM17-12C) in the Okinawa Trough sea area for 98 hours.

The fluorescence quantum efficiency of a plant is a parameter for estimating the electron transfer rate of Photosystem II in a photosynthetic reaction. By holding a plant in a dark place, plastoquinone in the photosystem is completely oxidized. The fluorescence quantum efficiency here is referred to as the maximum fluorescence quantum efficiency.

Figure 2A:
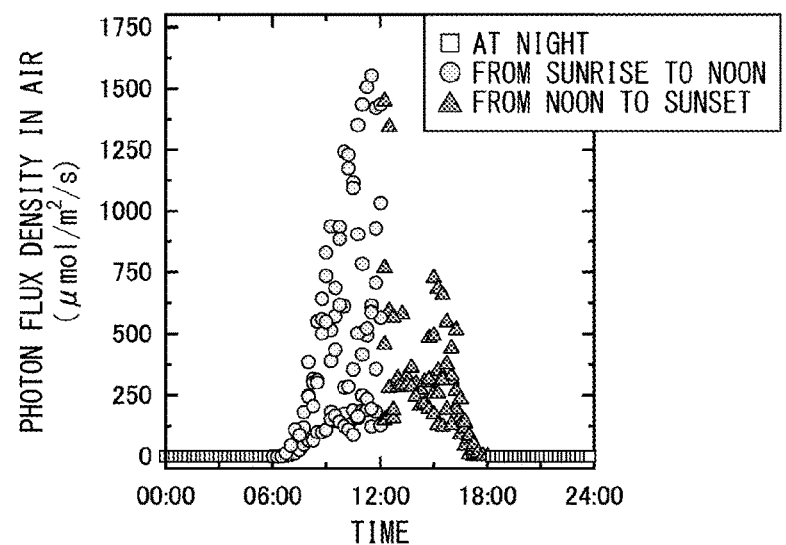
FIG. 2A is a graph showing the photon flux density in air at each time.

First, the aerial photon flux densities acquired at 1-minute intervals were averaged every 15 minutes, and the diurnal fluctuation was analyzed. FIG. 2A is a graph showing the distribution of the aerial photon flux densities averaged every 15 minutes at each time within the experimental period of 98 hours.

In FIG. 2A, the horizontal axis represents the time and the vertical axis represents the aerial photon flux densities. As a result, the distribution of the aerial photon flux densities with a peak around noon was observed. The underwater photon flux density of surface water is considered to have a positive correlation with the photon flux density in air.

Next, the maximum fluorescence quantum efficiency of the collected seawater was measured. First, surface water in the sea containing phytoplankton was collected in a light-blocking container at a constant speed for 15 minutes, and the collected seawater was held in a dark place for 15 minutes while the seawater was stirred using a float type rotor. By performing the step of holding the seawater in a dark place, the fluorescence quantum efficiency became the maximum fluorescence quantum efficiency.

Further, the seawater held in a dark place was intermittently introduced into a fluorescence quantum efficiency measuring machine through a light-blocking pipe using a tubing pump for 15 minutes. The speed of introducing the seawater into the fluorescence quantum efficiency measuring machine was set to the speed at which the total amount of seawater was discharged from the light-blocking container at the end of the introduction.

The seawater introduced into the fluorescence quantum efficiency measuring machine was irradiated with measurement light having a wavelength of 460 nm and an underwater photon flux density of 1 μmol/m²/sec to measure the fluorescence intensity and irradiated with saturated pulse light having a wavelength of 460 nm and an underwater photon flux density of 2000 μmol/m²/sec for 0.8 seconds to measure the fluorescence intensity.

These fluorescence intensities were measured at 1-minute intervals for 15 minutes. Further, in order to measure these fluorescence intensities for the same phytoplankton group, the drive of the tubing pump was stopped during the measurement.

The fluorescence intensity in a case of irradiation with measurement light is defined as $F_o$, the fluorescence intensity in a case of irradiation with saturated pulse light is defined as $F_m$, $F_m - F_o$, which is the amount of change in fluorescence intensity, is defined as $F_v$, and the maximum fluorescence quantum efficiency is defined as $F_v/F_m$. A plurality of maximum fluorescence quantum efficiencies $F_v/F_m$ obtained by performing measurement for 15 minutes were averaged to obtain the maximum fluorescence quantum efficiency $F_v/F_m$ of the seawater collected in the light-blocking container. As the fluorescence quantum efficiency measuring machine, a device in which a flow-through type cell was mounted on WATER-PAM (Walz) was used.

In Experimental Example 1, three containers for holding seawater in a dark place were provided. The maximum fluorescence quantum efficiency $F_v/F_m$ measured at 15-minute intervals during the experimental period was obtained by providing a phase difference of 15 minutes at the start of collection of a seawater sample in each container and repeatedly performing a series of steps of collecting seawater, holding the seawater in a dark place, and measuring the fluorescence quantum efficiency. The analysis results of the maximum fluorescence quantum efficiency $F_v/F_m$ are shown in FIGS. 2B and 2C.

Figure 2B:
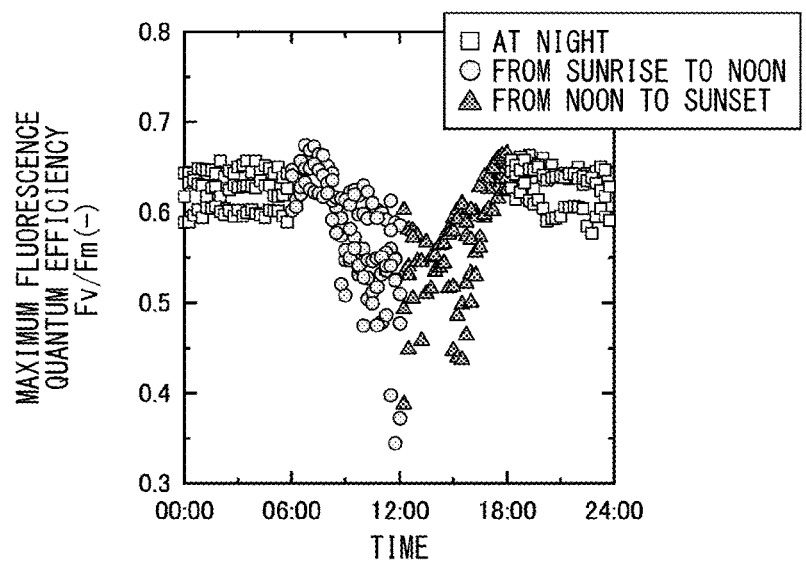
FIG. 2B is a graph showing the result of analyzing the relationship between the time at which phytoplankton is collected and a maximum fluorescence quantum efficiency $F_v/F_m$.
Figure 2C:
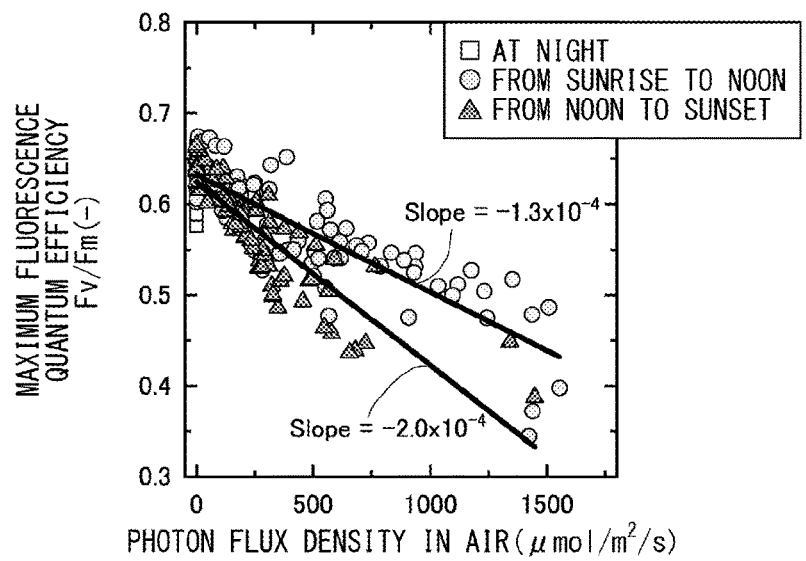
FIG. 2C is a graph showing the result of analyzing the relationship between the photon flux density in air at the time of collection and the corresponding maximum fluorescence quantum efficiency $F_v/F_m$.

FIG. 2B is a graph showing the result of analyzing the relationship between the time at which phytoplankton is collected in a light-blocking container and the maximum fluorescence quantum efficiency $F_v/F_m$, and FIG. 2C is a graph showing the result of analyzing the relationship between the photon flux density in air at the time of collection and the corresponding maximum fluorescence quantum efficiency $F_v/F_m$.

As a result, a diurnal fluctuation in which the maximum fluorescence quantum efficiency $F_v/F_m$ of phytoplankton contained in seawater was low in the daytime and high in the nighttime was confirmed. In particular, FIG. 2C shows that the decrease in the maximum fluorescence quantum efficiency $F_v/F_m$ of seawater is significant in a case where the seawater is collected under a condition in which the photon flux density in air exceeds 300 to 500 μmol/m²/sec.

Further, FIG. 2C shows that there is an inverse correlation between the photon flux density in air and the maximum fluorescence quantum efficiency $F_v/F_m$, but the absolute value of the slope from noon to sunset is greater than the absolute value of the slope from sunrise to noon.

This suggests that the maximum fluorescence quantum efficiency of phytoplankton is affected not by the light intensity measured for a short time immediately before collection of seawater but by a change in light intensity from the time at which seawater is collected to several hours before the collection.

Experimental Example 2

(Removal of Diurnal Fluctuation in Fluorescence Quantum Efficiency)

A method of alleviating the diurnal fluctuation in the fluorescence quantum efficiency by irradiating the seawater with weak light in advance was examined. The analysis was performed in the Okinawa Trough sea area as in Experimental Example 1, and the experimental period was set to 61 hours continuously.

Surface water was collected in each of three light-blocking containers at a constant speed for 30 minutes. A phase difference of 30 minutes was provided for the time of starting the collection in each container. Each of the collected seawater was retained in each container and intermittently discharged from each container for 30 minutes.

The seawater in the light-blocking container was continuously irradiated with a white LED having a photosynthetic effective wavelength range (400 to 700 nm) at an intensity of 150 μmol/m²/s. The fluorescence quantum efficiency of intermittently discharged seawater was measured using a fluorescence quantum efficiency measuring machine provided on the drainage conduit.

The measurement was continued for 61 hours by repeatedly performing a series of steps of collecting surface water, irradiating the seawater with light, and measuring the fluorescence quantum efficiency. Unlike Experimental Example 1, the seawater was not held in a dark place before the measurement of the fluorescence quantum efficiency.

Figure 3A:
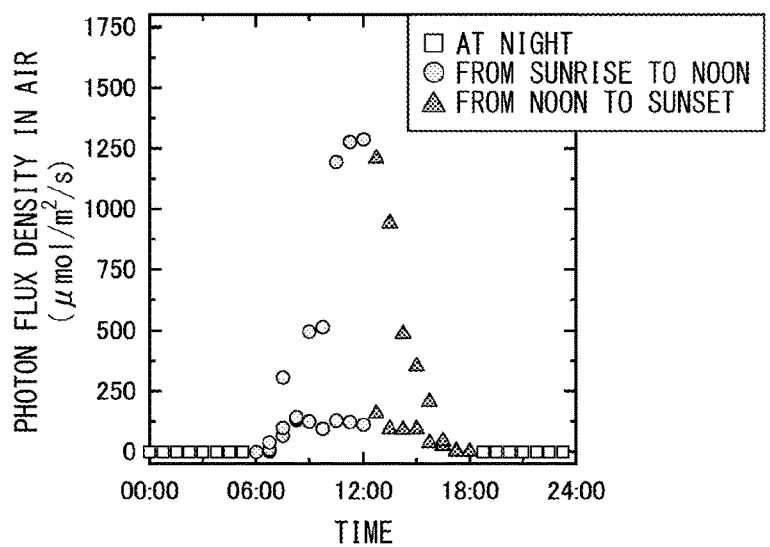
FIG. 3A is a graph showing the photon flux density in air at each time.

FIG. 3A is a graph showing the average value of the photon flux density in air every 30 minutes during the experimental period. In FIG. 3A, the horizontal axis represents the time.

The fluorescence intensity is defined as $F_o'$, the fluorescence intensity in a case of irradiation with saturated pulse light is defined as $F_m'$, $F_o'-F_m'$, which is the amount of change in fluorescence intensity, is defined as $F_v'$, and the fluorescence quantum efficiency is defined as $F_v'/F_m'$. The analysis results of the fluorescence quantum efficiency $F_v'/F_m'$ of the seawater irradiated with a white LED are shown in FIGS. 3B and 3C.

Figure 3B:
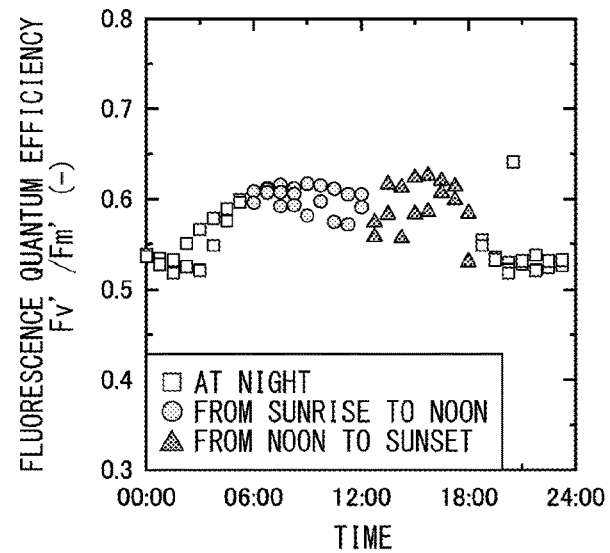
FIG. 3B is a graph showing the result of analyzing the time at which phytoplankton is collected and a fluorescence quantum efficiency $F_v'/F_m'$.
Figure 3C:
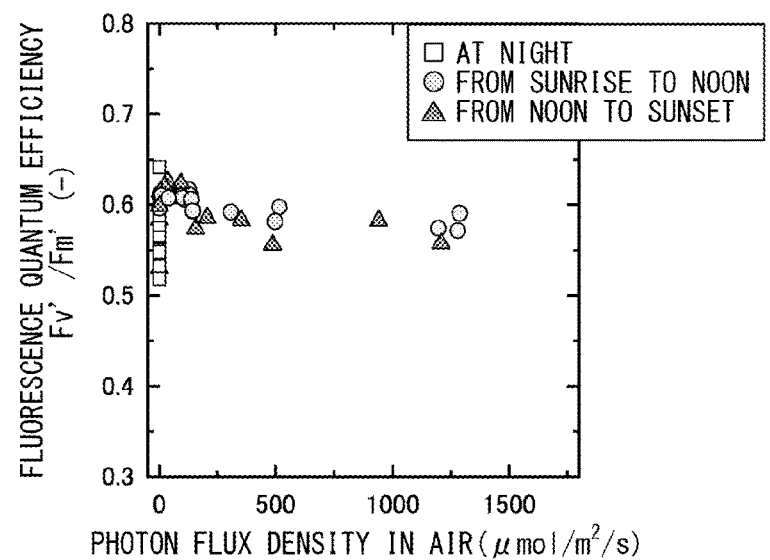
FIG. 3C is a graph showing the result of analyzing the relationship between the photon flux density in air at the time of collection and the corresponding fluorescence quantum efficiency $F_v'/F_m'$.

FIG. 3B is a graph showing the result of analyzing the time at which phytoplankton is collected and the fluorescence quantum efficiency $F_v'/F_m'$, and FIG. 3C is a graph showing the result of analyzing the relationship between the photon flux density in air at the time of collection and the corresponding fluorescence quantum efficiency $F_v'/F_m'$.

As a result, the fluorescence quantum efficiency $F_v'/F_m'$ measured by irradiating phytoplankton with weak light shows that the diurnal fluctuation is greatly suppressed as compared with the maximum fluorescence quantum efficiency $F_v/F_m$ in which phytoplankton is not irradiated with weak light of Experimental Example 1.

Experimental Example 3

(Detection 1 of Heavy Metal based on Fluorescence Quantum Efficiency $F_v'/F_m'$)

A method of detecting the presence of a heavy metal in seawater was examined based on the measured value of the fluorescence quantum efficiency.

Similar to Experimental Examples 1 and 2, surface water in the Okinawa Trough sea area was collected in one pretreatment tank. The pretreatment tank was continuously irradiated with light having an underwater photon flux density of (150 μmol/m²/s) using a white LED having a photosynthetic effective wavelength range (400 to 700 nm).

After the irradiation with light for approximately 60 minutes, a sea-floor mineral simulated eluate containing zinc and lead was added to the seawater in the pretreatment tank in the combination of any of the concentrations listed in Table 1. The fluorescence quantum efficiency $F_v'/F_m'$ of seawater in the pretreatment tank was measured from the start of irradiation with light to 180 minutes after the addition of the sea-floor mineral simulated eluate.

This experiment was repeated four times at different dates and times during the voyage survey period, and experiments were performed on a system with a combination of three different concentrations in Table 1 and a control system without the addition of the sea-floor mineral simulated eluate.

Figure 4:
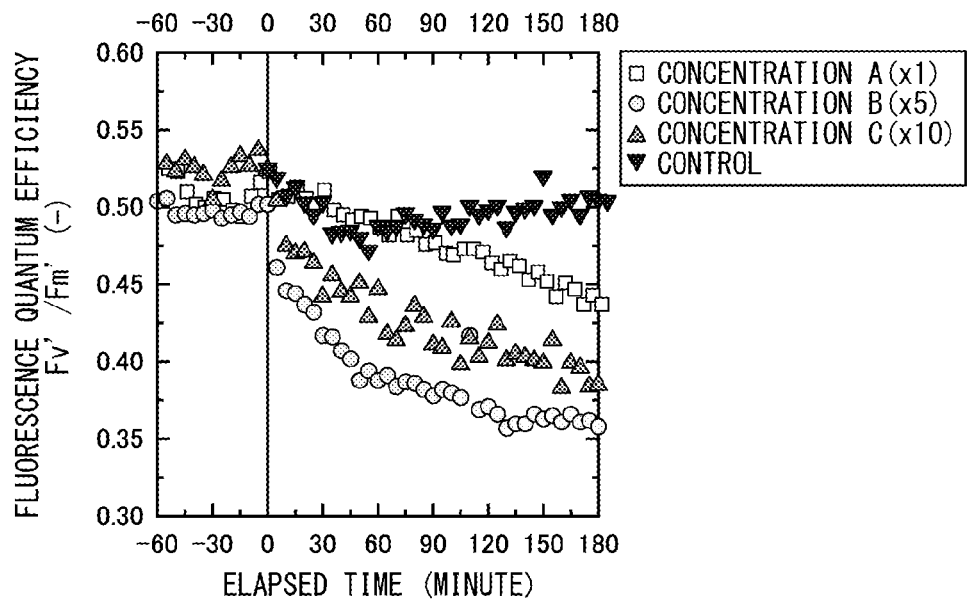
FIG. 4 is a graph showing the temporal response of the fluorescence quantum efficiency $F_v'/F_m'$ of phytoplankton in a case of being irradiated with weak light with respect to addition of heavy metals at different concentrations.

The results are shown in FIG. 4. FIG. 4 is a graph showing a decrease in the fluorescence quantum efficiency $F_v'/F_m'$ of phytoplankton with respect to the addition of heavy metals at different concentrations. In FIG. 4, the horizontal axis represents the elapsed time from the time at which the sea-floor mineral simulated eluate is added.

TABLE 1

| Concentration in Tank | Zinc (ppm) | Lead (ppm) |
| --- | --- | --- |
| Concentration A (×1) | 0.2 | 0.06 |
| Concentration B (×5) | 1.0 | 0.3 |
| Concentration C (×10) | 2.0 | 0.6 |
| Control | 0.0 | 0.0 |

As a result, the tendency of a decrease in the fluorescence quantum efficiency $F_v'/F_m'$ with respect to the control immediately after the sea-floor mineral simulated eluate was added was confirmed. That is, it was shown that in a case where the fluctuation range of the fluorescence quantum efficiency $F_v'/F_m'$ in a state where the seawater was not contaminated with a heavy metal was known in advance, the contamination of the seawater with a heavy metal was able to be suspected in a case of the measurement of the fluorescence quantum efficiency $F_v'/F_m'$ lower than the fluctuation range.

Experimental Example 4

(Detection 2 of Heavy Metal based on Fluorescence Quantum Efficiency $F_v'/F_m'$)

As shown in Experimental Examples 1 and 2, the weak-light irradiation treatment has an effect of suppressing the diurnal fluctuation in the fluorescence quantum efficiency. Meanwhile, as shown in Experimental Example 1, in a case where an inverse correlation is established between the diurnal fluctuation of the maximum fluorescence quantum efficiency and the photon flux density in air, a method of correcting the fluctuation in the fluorescence quantum efficiency in the daytime and the nighttime using the correlation is also considered.

Here, by showing the data on the change in the fluorescence quantum efficiency with time in a case where a heavy metal was added to seawater maintained in a dark place or irradiated with weak light, the advantage of the irradiation with weak light was analyzed for the correction of the fluorescence quantum efficiency using the above-described correlation.

Similar to Experimental Examples 1 and 2, surface water in the Okinawa Trough sea area was added to two pretreatment tanks A and B. However, the date and the time at which the surface water was collected vary between the pretreatment tanks A and B.

Pretreatment tank A was continuously irradiated with a white LED having a photosynthetic effective wavelength range (400 to 700 nm) at an intensity of (150 µmol/m²/s) for 240 minutes. Pretreatment tank B was not irradiated with light and was held in a dark place for 240 minutes.

A sea-floor mineral simulated eluate containing zinc and lead was added to the seawater 60 minutes after the start of the experiment. After the addition, the concentrations of zinc and lead in seawater are the same as the concentrations B listed in Table 1.

The seawater was withdrawn from both pretreatment tanks at 5-minute intervals, the fluorescence quantum efficiency $F_v'/F_m'$ was measured for the seawater in the pretreatment tank A, and the maximum fluorescence quantum efficiency $F_v/F_m$ was measured for the seawater in the pretreatment tank B.

Figure 5:
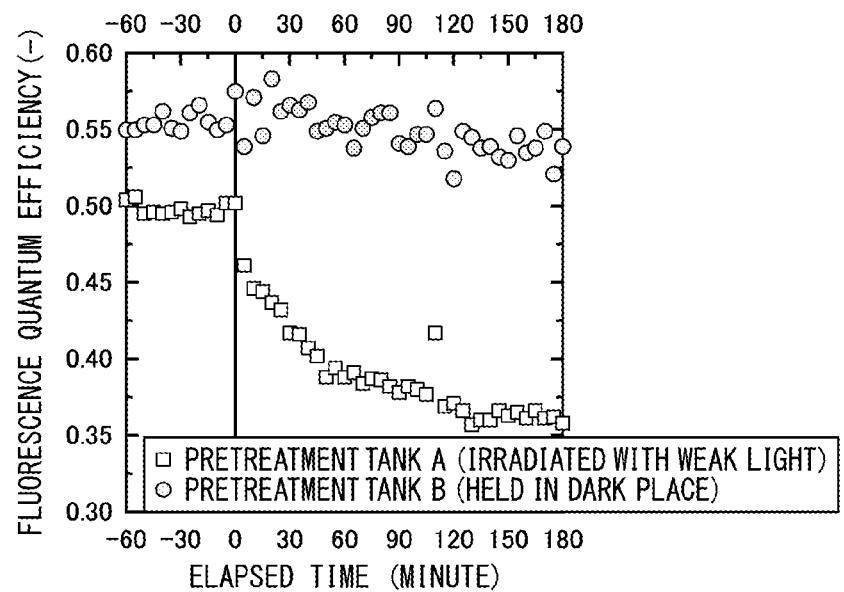
FIG. 5 is a graph showing a change in the fluorescence quantum efficiency $F_v'/F_m'$ of phytoplankton in a case of being irradiated with weak light with respect to addition of heavy metals and a change in the maximum fluorescence quantum efficiency $F_v/F_m$ of phytoplankton in a case of being held in a dark place.

The results are shown in FIG. 5. FIG. 5 is a graph showing a change in the fluorescence quantum efficiency $F_v'/F_m'$ of phytoplankton in a case of being irradiated with weak light with respect to addition of a heavy metal and a change in the maximum fluorescence quantum efficiency $F_v/F_m$ of phytoplankton in a case of being held in a dark place. In FIG. 5, the scale on the horizontal axis represents the elapsed time from the time of the addition of the sea-floor mineral simulated eluate.

As a result, the fluorescence quantum efficiency was decreased in the pretreatment tank A continuously irradiated with weak light after the addition of the heavy metal thereto as in Experimental Example 3. Meanwhile, the maximum fluorescence quantum efficiency was almost not decreased in pretreatment tank B held in a dark place even after the addition of the heavy metal thereto.

That is, it was shown that the maximum fluorescence quantum efficiency of phytoplankton almost did not change even in a case where the seawater in a dark place was contaminated with a heavy metal and the contamination with a heavy metal may not be detected by the method based on the value of the maximum fluorescence quantum efficiency.

In addition, it was clarified that even in a case where the seawater in a dark place is contaminated with a heavy metal, the presence of the heavy metal can be detected by performing irradiation with weak light in the subsequent pretreatment step and measuring the fluorescence quantum efficiency.

It was confirmed that the irradiation with weak light is a step required for suppressing the diurnal fluctuation of the fluorescence quantum efficiency and detecting the presence of a heavy metal generated in the dark period based on the measurement of the fluorescence quantum efficiency.

In the present experiment and Experimental Example 3, the response of the fluorescence quantum efficiency to the addition of a heavy metal under irradiation with weak light with different intensities was not confirmed.

Experimental Example 5

(Optimization of Conditions for Irradiation with Weak Light)

In order to examine the optimum weak light intensity for irradiation with weak light and the required irradiation time for suppressing the diurnal fluctuation in fluorescence quantum efficiency due to irradiation with weak light, the seawater collected during the day and at night was irradiated with weak light with different intensities and the short-term response of the fluorescence quantum efficiency was analyzed.

The experiment was carried out on the Japan Agency for Marine-Earth Science and Technology research vessel Kaimei (voyage number KM18-07C) in the Okinawa Trough sea area. Surface seawater was collected twice in the daytime (the photon flux density in air was in a range of 800 to 1200 μmol/m$^2$/s) and three times in the nighttime (the photon flux density in air was 1 μmol/m$^2$/s or less), and introduced to an immediately light-blocked pretreatment tank to be held in a dark place.

After 30 minutes, the seawater in the pretreatment tank was irradiated with weak light having an underwater photon flux density of 300, 150, or 35 μmol/m$^2$/s using a white LED having a photosynthetic effective wavelength range (400 to 700 nm) for 60 minutes. Thereafter, the irradiation with weak light was stopped, and the seawater was further held in a dark place for 30 minutes.

The seawater in the pretreatment tank was drained little by little immediately after the collection, and the fluorescence quantum efficiency was measured at 1-minute intervals using a fluorescence quantum efficiency measuring machine provided on the drainage conduit. As the fluorescence quantum efficiency measuring machine, a device in which a flow-through type cell was mounted on WATER-PAM (Walz) was used.

Figure 6A:
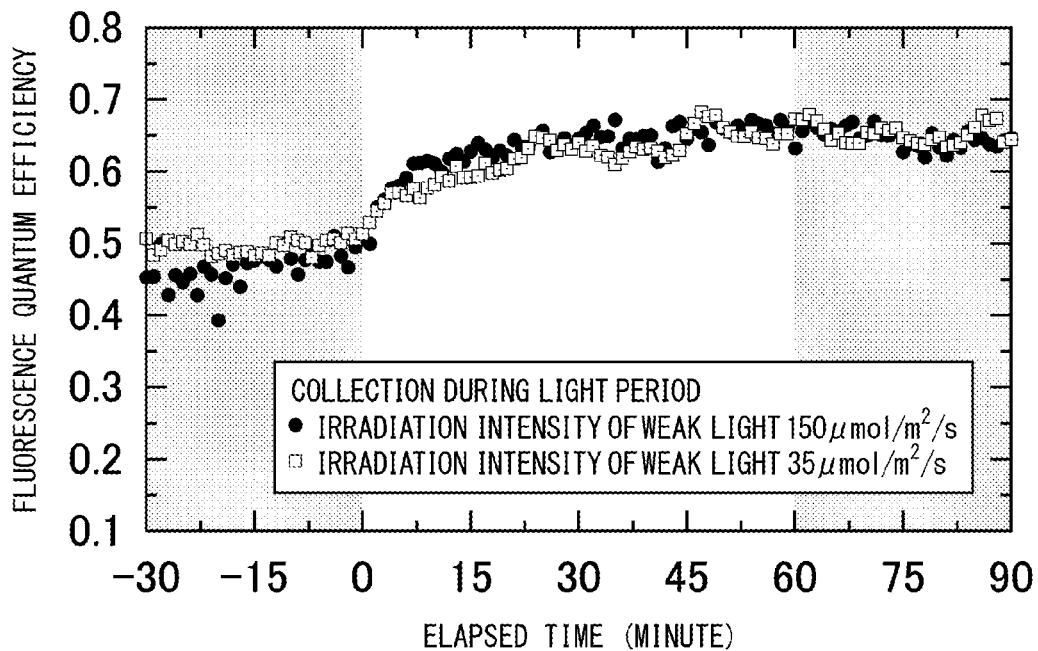
FIG. 6A is a graph showing the result of analyzing a continuous change in the fluorescence quantum efficiency of phytoplankton contained in seawater in a case where the storage environment of seawater collected during the daytime is changed from a dark place to a bright place and a bright place to a dark place.
Figure 6B:
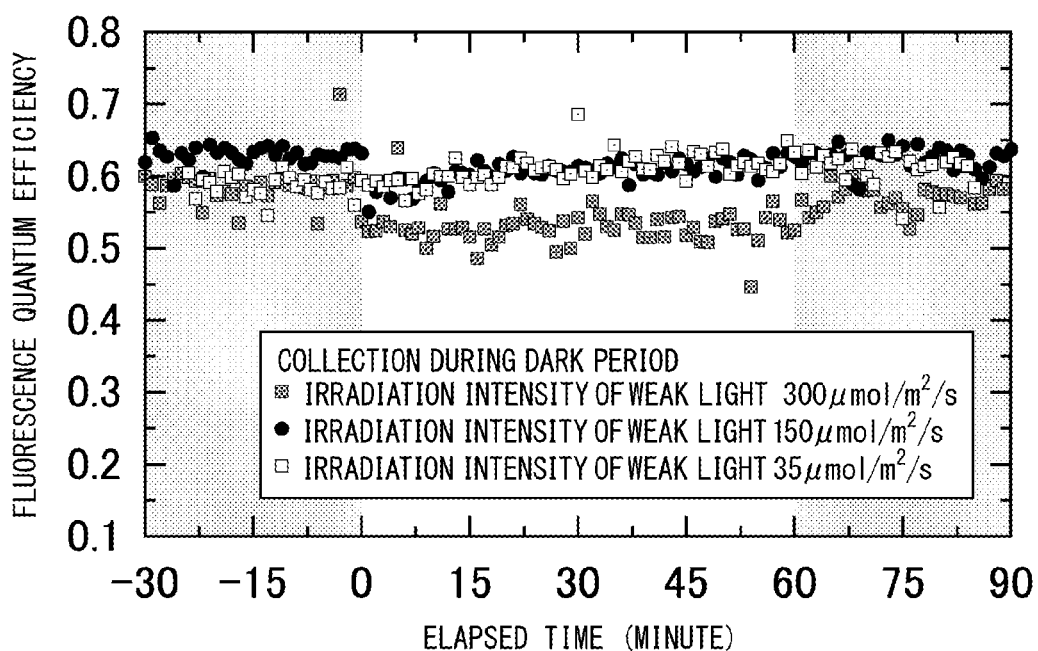
FIG. 6B is a graph showing the result of performing the same analysis as in FIG. 6A on seawater collected at night.

The results are shown in FIGS. 6A and 6B. FIGS. 6A and 6B show the results of analyzing a change in the fluorescence quantum efficiency due to the irradiation with weak light and the holding in a dark place. FIG. 6A is a graph showing the result of analyzing a continuous change in the fluorescence quantum efficiency of phytoplankton contained in seawater in a case where the storage environment of seawater collected during the daytime is changed from a dark place to a bright place and a bright place to a dark place. FIG. 6B is a graph showing the result of performing the same analysis as in FIG. 6A on seawater collected at night.

In FIGS. 6A and 6B, the elapsed time 0 indicates the start of irradiation with weak light, the period between −30 minutes to 0 minutes indicates that seawater was held in a dark place, the period between 0 minutes to 60 minutes indicates that seawater was irradiated with weak light, and the period between 60 minutes to 90 minutes indicates that seawater was held in a dark place, in the horizontal axis.

The initial fluorescence quantum efficiency of seawater collected during the day was in a range of 0.4 to 0.5. The values were almost not changed in a dark place for 30 minutes. The value was increased immediately after the start of irradiation with weak light and reached 0.60 to 0.65 approximately 30 to 45 minutes after the start of irradiation.

After the irradiation with weak light was stopped, the fluorescence quantum efficiency was maintained almost constant. The intensity of light applied to the seawater collected during the day was in two stages of 150 and 35 μmol/m$^2$/s, but there was almost no difference in the increasing tendency of the fluorescence quantum efficiency due to the irradiation with weak light.

The initial fluorescence quantum efficiency of seawater collected at night was in a range of 0.55 to 0.65. These values were almost not changed during the first 30 minutes of holding the seawater in a dark place, and only a slight decrease was observed in the next 60 minutes of irradiation with weak light with any of the above-described intensities. Further, the fluorescence quantum efficiency after the irradiation with weak light was stopped was also maintained almost constant.

As shown in the present experiment, it was found that the fluorescence quantum efficiency of phytoplankton in the surface seawater collected at night was almost not changed under irradiation with weak light having an underwater photon flux density of 35 to 300 μmol/m$^2$/s, that is, a decrease in the fluorescence quantum efficiency in a sea area during the day in which the photon flux density in air exceeds a range of 300 to 500 μmol/m$^2$/s did not occur.

The fluorescence quantum efficiency of phytoplankton in seawater collected during the day was lower than that of seawater collected at night, but the fluorescence quantum efficiency of phytoplankton in seawater collected during the day was increased to a value close to the fluorescence quantum efficiency of seawater collected at night during a period of 30 to 45 minutes by irradiating the seawater with weak light with a density of 35 to 150 μmol/m$^2$/s and was maintained almost constant during the subsequent irradiation period.

In the present experiment, even though the experiment of irradiating the seawater collected during the day with weak light having an underwater photon flux density of 300 μmol/m$^2$/s was not performed, a decrease in fluorescence quantum efficiency was not recognized even in a case of irradiating the seawater collected at night with weak light having an underwater photon flux density of 300 μmol/m$^2$/s. In consideration of the above-described result, it was considered that the irradiation has an effect of recovering the fluorescence quantum efficiency decreasing during the daytime in a sea area to a value close to the fluorescence quantum efficiency at night by performing irradiation with weak light with a density of 35 to 300 μmol/m$^2$/s for 30 to 60 minutes or longer.

Even though the experiment of irradiating seawater in the pretreatment tank with light having an underwater photon flux density of greater than 300 μmol/m$^2$/s was not performed, a tendency that the fluorescence quantum efficiency of phytoplankton was decreased in seawater collected from a sea area with a photon flux density greater than a range of 300 to 500 μmol/m$^2$/s was recognized in Experimental Example 1, and thus the upper limit of the irradiation intensity of weak light for suppressing the diurnal fluctuation in fluorescence quantum efficiency in a natural sea area was considered to be an underwater photon flux density of 300 μmol/m$^2$/s.

Further, since the response of the fluorescence quantum efficiency under irradiation with weak light having an underwater photon flux density of less than 35 μmol/m$^2$/s was not confirmed, the lower limit of the irradiation intensity of weak light is unclear. However, the fluorescence quantum efficiency was almost not changed in any of the seawaters during a dark place holding period of 30 minutes before the irradiation with weak light in the present experiment. That is, it was considered that the lower limit of the irradiation intensity of weak light for suppressing the diurnal fluctuation in the fluorescence quantum efficiency in a natural sea area is less than an underwater photon flux density of 35 μmol/m$^2$/s and the effect of suppressing the fluctuation in a case of holding seawater in a dark place is not recognized.

As shown in the results described above, it was considered that the diurnal fluctuation in the fluorescence quantum efficiency in a natural sea area can be suppressed by irradiating seawater with weak light having an underwater photon flux density of 300 μmol/m$^2$/s or less for 30 to 60 minutes or longer.

In the present experiment, the fluorescence quantum efficiency of seawater held in a dark place after 60 minutes of the irradiation with weak light irradiation was maintained at a value close to the fluorescence quantum efficiency at the time of completion of irradiation with weak light for approximately 30 minutes, regardless of a difference in seawater collection time and weak-light irradiation intensity. Therefore, it was found that the measurement of the fluorescence quantum efficiency is not necessarily performed immediately after the completion of irradiation with weak light and may be performed within 30 minutes in a case where the test liquid is held in a dark place.

Hereinbefore, the present invention has been described based on the best modes, but the present invention is not limited to the above-described best modes, and various modifications can be made without departing from the scope of the present invention.

The method for detecting contamination with a photosynthesis inhibitor using the device for detecting contamination with a photosynthesis inhibitor is not limited to a configuration including a liquid supply step of supplying a test liquid to a pretreatment tank while irradiating phytoplankton in the test liquid in the pretreatment tank with weak light having an underwater photon flux density that does not cause photoinhibition, a storing and weak-light irradiation step of irradiating the phytoplankton in the test liquid of the pretreatment tank with the same weak light as that in the liquid supply step for a preset time after the stopping of the liquid supply to the pretreatment tank (the completion of the liquid supply step), and a fluorescence quantum efficiency measurement step of sequentially irradiating the test liquid remaining in the drainage conduit with measurement light and saturated pulse light to measure the fluorescence quantum efficiency in a case where the test liquid is drained from the pretreatment tank while irradiating the phytoplankton in the test liquid of the pretreatment tank with the same weak light as that in the liquid supply step after the completion of the storing and weak-light irradiation step and the flow of the test liquid into the drainage conduit from the pretreatment tank during the discharge period is stopped.

The method for detecting contamination with a photosynthesis inhibitor using the device for detecting contamination with a photosynthesis inhibitor can also employ a configuration in which only the irradiation with weak light is not provided in the liquid supply step or a configuration in which the irradiation with weak light is not provided in the liquid supply step and the fluorescence quantum efficiency measurement step, among the liquid supply step, the storing and weak-light irradiation step, and the fluorescence quantum efficiency measurement step.

REFERENCE SIGNS LIST

1: Device for detecting contamination with photosynthesis inhibitor
2: Test liquid
10: Pump
11: Suction pipe
20: Pretreatment device
21: Pretreatment tank
22: Irradiation light source
23: Stirring device
30: Liquid supply conduit
31: Liquid supply main pipe
32: Branch liquid supply pipe
33: Liquid supply side on-off valve
40: Drainage conduit
41: Drainage pipe for each tank
42: Drainage confluent conduit
50: Fluorescence quantum efficiency measuring machine
61: Drainage side on-off valve
62: Discharge pump (first discharge pump)
63: Second discharge pump
70: Alarm output device
71: Speaker
80: Sample fractionation device
81: Storage container
90: Branch discharge conduit

The invention claimed is:

1. A method for detecting contamination with a photosynthesis inhibitor, the method comprising:
   a liquid supply step of supplying a preset storage amount of a test liquid at a preset time in a light-blocking pretreatment tank while irradiating phytoplankton in the test liquid with weak light having an underwater photon flux density that does not cause photoinhibition;
   a storing and weak-light irradiation step of stopping the liquid supply of the test liquid to the pretreatment tank at a time at which the storage amount of the test liquid reaches a preset value, and irradiating the test liquid with light having the same underwater photon flux density as that in the liquid supply step for a preset time starting from the time at which the liquid supply is stopped; and
   a fluorescence quantum efficiency measurement step of irradiating the test liquid in the pretreatment tank with light having the same underwater photon flux density as that in the storing and weak-light irradiation step, discharging the test liquid from the pretreatment tank through a drainage conduit, and measuring a fluorescence quantum efficiency by sequentially irradiating, with measurement light and saturated pulse light, the test liquid remaining in the drainage conduit when flow of the test liquid into the drainage conduit is stopped during a discharge period of the pretreatment tank, after completion of the storing and weak-light irradiation step.

2. The method for detecting contamination with a photosynthesis inhibitor according to claim 1,
   wherein the fluorescence quantum efficiency measurement step is a step of repeating both of a drainage operation for discharging the test liquid from the pretreatment tank through the drainage conduit, and a measurement operation for measuring the fluorescence quantum efficiency by sequentially irradiating, with measurement light and saturated pulse light, the test liquid remaining in the drainage conduit when the discharge is stopped, for two or more times during a period in which the test liquid remains in the pretreatment tank.

3. The method for detecting contamination with a photosynthesis inhibitor according to claim 1,
   wherein a series of steps from the liquid supply step to the fluorescence quantum efficiency measurement step are repeatedly performed by combining one or a plurality of the pretreatment tanks, and
   a temporal change in fluorescence quantum efficiency of a plurality of test liquids collected at different times is measured.

4. The method for detecting contamination with a photosynthesis inhibitor according to claim 1,
   wherein, based on a preset fluorescence quantum efficiency or a fluorescence quantum efficiency less than a lower limit of a fluctuation range of fluorescence quantum efficiencies of a plurality of test liquids that do not contain a photosynthesis inhibitor having an inhibitory effect on photosynthesis of the phytoplankton in the test liquids or contain the photosynthesis inhibitor at a concentration less than the concentration at which the inhibitory effect is exhibited, a decrease in fluorescence quantum efficiency of another test liquid which occurs in a case where the test liquid contains the photosynthesis inhibitor at a concentration greater than or equal to the concentration at which the inhibitory effect is exhibited is determined.

5. The method for detecting contamination with a photosynthesis inhibitor according to claim 2,
wherein a series of steps from the liquid supply step to the fluorescence quantum efficiency measurement step are repeatedly performed by combining one or a plurality of the pretreatment tanks, and
a temporal change in fluorescence quantum efficiency of a plurality of test liquids collected at different times is measured.

6. The method for detecting contamination with a photosynthesis inhibitor according to claim 2,
wherein, based on a preset fluorescence quantum efficiency or a fluorescence quantum efficiency less than a lower limit of a fluctuation range of fluorescence quantum efficiencies of a plurality of test liquids that do not contain a photosynthesis inhibitor having an inhibitory effect on photosynthesis of the phytoplankton in the test liquids or contain the photosynthesis inhibitor at a concentration less than the concentration at which the inhibitory effect is exhibited, a decrease in fluorescence quantum efficiency of another test liquid which occurs in a case where the test liquid contains the photosynthesis inhibitor at a concentration greater than or equal to the concentration at which the inhibitory effect is exhibited is determined.

7. The method for detecting contamination with a photosynthesis inhibitor according to claim 3,
wherein, based on a preset fluorescence quantum efficiency or a fluorescence quantum efficiency less than a lower limit of a fluctuation range of fluorescence quantum efficiencies of a plurality of test liquids that do not contain a photosynthesis inhibitor having an inhibitory effect on photosynthesis of the phytoplankton in the test liquids or contain the photosynthesis inhibitor at a concentration less than the concentration at which the inhibitory effect is exhibited, a decrease in fluorescence quantum efficiency of another test liquid which occurs in a case where the test liquid contains the photosynthesis inhibitor at a concentration greater than or equal to the concentration at which the inhibitory effect is exhibited is determined.

* * * * *